United States Patent
Assouline et al.

(10) Patent No.: US 12,299,832 B2
(45) Date of Patent: *May 13, 2025

(54) AR POSITION AND ORIENTATION ALONG A PLANE

(71) Applicant: Snap Inc., Santa Monica, CA (US)

(72) Inventors: Avihay Assouline, Tel Aviv (IL); Itamar Berger, Hod Hasharon (IL); Gal Dudovitch, Tel Aviv (IL); Peleg Harel, Ramat Gan (IL); Gal Sasson, Kibbutz Ayyelet Hashahar (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,793

(22) Filed: Feb. 7, 2024

(65) Prior Publication Data

US 2024/0177430 A1 May 30, 2024

Related U.S. Application Data

(63) Continuation of application No. 17/566,046, filed on Dec. 30, 2021, now Pat. No. 11,928,783.

(51) Int. Cl.
*G06V 20/20* (2022.01)
*G06T 19/00* (2011.01)
(Continued)

(52) U.S. Cl.
CPC ............ *G06T 19/006* (2013.01); *G06T 19/20* (2013.01); *G06V 10/764* (2022.01);
(Continued)

(58) Field of Classification Search
CPC .................. G06T 19/006; G06T 19/20; G06T 2219/2016; G06V 10/764; G06V 10/774;
(Continued)

(56) References Cited

U.S. PATENT DOCUMENTS

| 5,754,939 A | 5/1998 | Herz et al. |
| 5,880,731 A | 3/1999 | Liles et al. |

(Continued)

FOREIGN PATENT DOCUMENTS

| CA | 2887596 A1 | 7/2015 |
| CN | 104156700 A | 11/2014 |

(Continued)

OTHER PUBLICATIONS

"U.S. Appl. No. 17/566,046, Non Final Office Action mailed Jul. 20, 2023", 13 pgs.

(Continued)

*Primary Examiner* — Jitesh Patel
(74) *Attorney, Agent, or Firm* — Schwegman Lundberg & Woessner, P.A.

(57) ABSTRACT

Aspects of the present disclosure involve a system for presenting AR items. The system performs operations including receiving a video that includes a depiction of one or more real-world objects in a real-world environment and obtaining depth data related to the real-world environment. The operations include generating a three-dimensional (3D) model of the real-world environment based on the video and the depth data and adding an augmented reality (AR) item to the video based on the 3D model of the real-world environment. The operations include determining that the AR item has been placed on a vertical plane of the real-world environment and modifying an orientation of the AR item to correspond to an orientation of the vertical plane.

20 Claims, 12 Drawing Sheets

(51) Int. Cl.
*G06T 19/20* (2011.01)
*G06V 10/764* (2022.01)
*G06V 10/774* (2022.01)
*G06V 10/776* (2022.01)
*G06V 10/82* (2022.01)

(52) U.S. Cl.
CPC .......... *G06V 10/774* (2022.01); *G06V 10/776* (2022.01); *G06V 10/82* (2022.01); *G06V 20/20* (2022.01); *G06T 2219/2016* (2013.01)

(58) Field of Classification Search
CPC ...... G06V 10/776; G06V 10/82; G06V 20/20; G06V 20/64; G06V 40/161
See application file for complete search history.

(56) References Cited

U.S. PATENT DOCUMENTS

| | | |
|---|---|---|
| 6,023,270 A | 2/2000 | Brush, II et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,223,165 B1 | 4/2001 | Lauffer |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,772,195 B1 | 8/2004 | Hatlelid et al. |
| 6,842,779 B1 | 1/2005 | Nishizawa |
| 6,980,909 B2 | 12/2005 | Root et al. |
| 7,113,917 B2 | 9/2006 | Jacobi et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,342,587 B2 | 3/2008 | Danzig et al. |
| 7,356,564 B2 | 4/2008 | Hartselle et al. |
| 7,376,715 B2 | 5/2008 | Cunningham et al. |
| 7,391,900 B2 | 6/2008 | Kim et al. |
| 7,411,493 B2 | 8/2008 | Smith |
| 7,468,729 B1 | 12/2008 | Levinson |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,636,755 B2 | 12/2009 | Blattner et al. |
| 7,639,251 B2 | 12/2009 | Gu et al. |
| 7,703,140 B2 | 4/2010 | Nath et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz et al. |
| 8,146,005 B2 | 3/2012 | Jones et al. |
| 8,151,191 B2 | 4/2012 | Nicol |
| 8,170,957 B2 | 5/2012 | Richard |
| 8,199,747 B2 | 6/2012 | Rojas |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,570,907 B2 | 10/2013 | Garcia, Jr. et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,745,132 B2 | 6/2014 | Obradovich |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,148,424 B1 | 9/2015 | Yang |
| 9,159,166 B2 | 10/2015 | Finn et al. |
| 9,160,993 B1 | 10/2015 | Lish et al. |
| 9,191,776 B2 | 11/2015 | Root et al. |
| 9,204,252 B2 | 12/2015 | Root et al. |
| 9,225,805 B2 | 12/2015 | Kujawa et al. |
| 9,225,897 B1 | 12/2015 | Sehn |
| 9,237,202 B1 | 1/2016 | Sehn |
| 9,241,184 B2 | 1/2016 | Weerasinghe |
| 9,256,860 B2 | 2/2016 | Herger et al. |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,443,227 B2 | 9/2016 | Evans et al. |
| 9,460,541 B2 | 10/2016 | Li et al. |
| 9,482,882 B1 | 11/2016 | Hanover et al. |

(56) References Cited

U.S. PATENT DOCUMENTS

| | | |
|---|---|---|
| 9,482,883 B1 | 11/2016 | Meisenholder |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,785,796 B1 | 10/2017 | Murphy et al. |
| 9,792,714 B2 | 10/2017 | Li et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,002,337 B2 | 6/2018 | Siddique et al. |
| 10,026,209 B1 | 7/2018 | Dagley et al. |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,133,951 B1 | 11/2018 | Mendonca et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,250,948 B1 | 4/2019 | Bortz et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,482,674 B1 | 11/2019 | Wu et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,679,428 B1 | 6/2020 | Chen et al. |
| 10,740,974 B1 * | 8/2020 | Cowburn ............... G06Q 50/01 |
| 10,956,967 B2 | 3/2021 | Ayush et al. |
| 11,024,092 B2 | 6/2021 | Harviainen |
| 11,057,667 B2 | 7/2021 | Rabbat et al. |
| 11,210,863 B1 | 12/2021 | Yan et al. |
| 11,288,879 B2 | 3/2022 | Chen et al. |
| 11,830,209 B2 | 11/2023 | Chen et al. |
| 11,887,260 B2 | 1/2024 | Assouline et al. |
| 11,954,762 B2 | 4/2024 | Ivanov et al. |
| 2002/0047868 A1 | 4/2002 | Miyazawa |
| 2002/0067362 A1 | 6/2002 | Agostino Nocera et al. |
| 2002/0144154 A1 | 10/2002 | Tomkow |
| 2002/0169644 A1 | 11/2002 | Greene |
| 2003/0052925 A1 | 3/2003 | Daimon et al. |
| 2003/0126215 A1 | 7/2003 | Udell et al. |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0162419 A1 | 7/2005 | Kim et al. |
| 2005/0198128 A1 | 9/2005 | Anderson et al. |
| 2005/0206610 A1 | 9/2005 | Cordelli |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2006/0294465 A1 | 12/2006 | Ronen et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0113181 A1 | 5/2007 | Blattner et al. |
| 2007/0162942 A1 | 7/2007 | Hamynen et al. |
| 2007/0168863 A1 | 7/2007 | Blattner et al. |
| 2007/0176921 A1 | 8/2007 | Iwasaki et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0071559 A1 | 3/2008 | Arrasvuori |
| 2008/0120409 A1 | 5/2008 | Sun et al. |
| 2008/0158222 A1 | 7/2008 | Li et al. |
| 2008/0207176 A1 | 8/2008 | Brackbill et al. |
| 2008/0252723 A1 | 10/2008 | Park |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0016617 A1 | 1/2009 | Bregman-amitai et al. |
| 2009/0042588 A1 | 2/2009 | Lottin et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0132453 A1 | 5/2009 | Hangartner et al. |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0045869 A1 | 2/2010 | Baseley et al. |
| 2010/0082427 A1 | 4/2010 | Burgener et al. |
| 2010/0115426 A1 | 5/2010 | Liu et al. |
| 2010/0131880 A1 | 5/2010 | Lee et al. |
| 2010/0162149 A1 | 6/2010 | Sheleheda et al. |
| 2010/0185665 A1 | 7/2010 | Horn et al. |
| 2010/0203968 A1 | 8/2010 | Gill et al. |
| 2010/0227682 A1 | 9/2010 | Reville et al. |
| 2010/0306669 A1 | 12/2010 | Della Pasqua |
| 2011/0093780 A1 | 4/2011 | Dunn |
| 2011/0099507 A1 | 4/2011 | Nesladek et al. |
| 2011/0115798 A1 | 5/2011 | Nayar et al. |
| 2011/0145564 A1 | 6/2011 | Moshir et al. |
| 2011/0148864 A1 | 6/2011 | Lee et al. |
| 2011/0202598 A1 | 8/2011 | Evans et al. |
| 2011/0213845 A1 | 9/2011 | Logan et al. |
| 2011/0239136 A1 | 9/2011 | Goldman et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0056717 A1 | 3/2012 | Maharbiz et al. |
| 2012/0068913 A1 | 3/2012 | Bar-Zeev et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0103760 A1 | 4/2013 | Golding et al. |
| 2013/0194301 A1 | 8/2013 | Robbins et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0290443 A1 | 10/2013 | Collins et al. |
| 2014/0032682 A1 | 1/2014 | Prado et al. |
| 2014/0043329 A1 | 2/2014 | Wang et al. |

(56) References Cited

U.S. PATENT DOCUMENTS

| | | |
|---|---|---|
| 2014/0055554 A1 | 2/2014 | Du et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0168056 A1 | 6/2014 | Swaminathan et al. |
| 2014/0201527 A1 | 7/2014 | Krivorot |
| 2014/0282096 A1 | 9/2014 | Rubinstein et al. |
| 2014/0285522 A1 | 9/2014 | Kim et al. |
| 2014/0298382 A1 | 10/2014 | Jo et al. |
| 2014/0298383 A1 | 10/2014 | Jo et al. |
| 2014/0317659 A1 | 10/2014 | Yasutake |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0362084 A1 | 12/2014 | Ooi et al. |
| 2015/0009130 A1* | 1/2015 | Motta ............... G06F 3/0346 |
| | | 345/156 |
| 2015/0052465 A1 | 2/2015 | Altin et al. |
| 2015/0103174 A1 | 4/2015 | Emura et al. |
| 2015/0193982 A1 | 7/2015 | Mihelich et al. |
| 2015/0199082 A1 | 7/2015 | Scholler et al. |
| 2015/0206349 A1 | 7/2015 | Rosenthal et al. |
| 2015/0227602 A1 | 8/2015 | Ramu et al. |
| 2015/0254905 A1 | 9/2015 | Ramsby et al. |
| 2015/0276379 A1 | 10/2015 | Ni et al. |
| 2015/0310667 A1 | 10/2015 | Young et al. |
| 2015/0317829 A1 | 11/2015 | Carter et al. |
| 2015/0331970 A1 | 11/2015 | Jovanovic |
| 2016/0033770 A1 | 2/2016 | Fujimaki et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0134840 A1 | 5/2016 | Mcculloch |
| 2016/0180887 A1 | 6/2016 | Sehn |
| 2016/0210784 A1 | 7/2016 | Ramsby et al. |
| 2016/0234149 A1 | 8/2016 | Tsuda et al. |
| 2016/0234151 A1 | 8/2016 | Son |
| 2016/0277419 A1 | 9/2016 | Allen et al. |
| 2016/0321708 A1 | 11/2016 | Sehn |
| 2016/0343171 A1 | 11/2016 | Waldman et al. |
| 2016/0359957 A1 | 12/2016 | Laliberte |
| 2016/0359987 A1 | 12/2016 | Laliberte |
| 2016/0379405 A1 | 12/2016 | Baca et al. |
| 2017/0069141 A1 | 3/2017 | Carter et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0147905 A1 | 5/2017 | Huang et al. |
| 2017/0154425 A1 | 6/2017 | Pierce et al. |
| 2017/0161382 A1 | 6/2017 | Ouimet et al. |
| 2017/0199855 A1 | 7/2017 | Fishbeck |
| 2017/0220863 A1 | 8/2017 | Lection et al. |
| 2017/0235848 A1 | 8/2017 | Van et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0299394 A1 | 10/2017 | Lee |
| 2017/0310934 A1 | 10/2017 | Du et al. |
| 2017/0312634 A1 | 11/2017 | Ledoux et al. |
| 2017/0374003 A1 | 12/2017 | Allen et al. |
| 2017/0374508 A1 | 12/2017 | Davis et al. |
| 2018/0005448 A1 | 1/2018 | Choukroun et al. |
| 2018/0012082 A1 | 1/2018 | Satazoda et al. |
| 2018/0045963 A1 | 2/2018 | Hoover et al. |
| 2018/0047200 A1 | 2/2018 | O'Hara et al. |
| 2018/0082480 A1 | 3/2018 | White et al. |
| 2018/0096528 A1 | 4/2018 | Needham et al. |
| 2018/0113587 A1 | 4/2018 | Allen et al. |
| 2018/0115503 A1 | 4/2018 | Baldwin et al. |
| 2018/0121762 A1 | 5/2018 | Han et al. |
| 2018/0136000 A1 | 5/2018 | Rasmusson, Jr. et al. |
| 2018/0137642 A1 | 5/2018 | Malisiewicz et al. |
| 2018/0137644 A1 | 5/2018 | Rad et al. |
| 2018/0189532 A1 | 7/2018 | Bataller et al. |
| 2018/0225517 A1 | 8/2018 | Holzer et al. |
| 2018/0247138 A1 | 8/2018 | Kang |
| 2018/0268220 A1 | 9/2018 | Lee et al. |
| 2018/0300880 A1 | 10/2018 | Fan et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0315248 A1* | 11/2018 | Bastov ............... G06T 19/20 |
| 2018/0341386 A1 | 11/2018 | Inomata |
| 2019/0001223 A1 | 1/2019 | Blackstock et al. |
| 2019/0057616 A1 | 2/2019 | Cohen et al. |
| 2019/0094981 A1 | 3/2019 | Bradski et al. |
| 2019/0096046 A1 | 3/2019 | Kalantari et al. |
| 2019/0108683 A1 | 4/2019 | Valli et al. |
| 2019/0108686 A1* | 4/2019 | Spivack ............ G06Q 30/0277 |
| 2019/0158910 A1 | 5/2019 | Rabbat et al. |
| 2019/0188920 A1 | 6/2019 | Mcphee et al. |
| 2019/0205646 A1 | 7/2019 | Piramuthu et al. |
| 2019/0251401 A1 | 8/2019 | Shechtman et al. |
| 2019/0310757 A1 | 10/2019 | Lee et al. |
| 2019/0378204 A1 | 12/2019 | Ayush et al. |
| 2020/0111232 A1 | 4/2020 | Bleyer et al. |
| 2020/0175311 A1 | 6/2020 | Xu et al. |
| 2020/0211288 A1 | 7/2020 | Woods et al. |
| 2020/0242813 A1 | 7/2020 | Nishikawa et al. |
| 2020/0258313 A1 | 8/2020 | Chen et al. |
| 2020/0302681 A1 | 9/2020 | Totty et al. |
| 2020/0394843 A1 | 12/2020 | Ramachandra Iyer |
| 2020/0413011 A1 | 12/2020 | Zass et al. |
| 2021/0027083 A1 | 1/2021 | Cohen et al. |
| 2021/0027471 A1 | 1/2021 | Cohen et al. |
| 2021/0042988 A1 | 2/2021 | Molyneaux et al. |
| 2021/0183128 A1 | 6/2021 | Miller |
| 2021/0286504 A1* | 9/2021 | Moore ............... G06F 3/04842 |
| 2021/0295599 A1 | 9/2021 | Adkinson et al. |
| 2021/0383116 A1 | 12/2021 | Mavrantonakis et al. |
| 2021/0383912 A1 | 12/2021 | Jackson et al. |
| 2022/0006973 A1* | 1/2022 | Kies ..................... H04N 13/122 |
| 2022/0058553 A1 | 2/2022 | Stewart et al. |
| 2022/0068037 A1 | 3/2022 | Pardeshi |
| 2022/0101638 A1 | 3/2022 | Bae et al. |
| 2022/0156426 A1 | 5/2022 | Hampali et al. |
| 2022/0172448 A1 | 6/2022 | Chen et al. |
| 2022/0222724 A1 | 7/2022 | Graham |
| 2022/0327608 A1 | 10/2022 | Assouline et al. |
| 2022/0366189 A1 | 11/2022 | Oreifej et al. |
| 2022/0413434 A1 | 12/2022 | Parra Pozo et al. |
| 2023/0022194 A1 | 1/2023 | Soryal |
| 2023/0063209 A1* | 3/2023 | Oreifej ............... G06N 3/045 |
| 2023/0214900 A1 | 7/2023 | Assouline et al. |
| 2023/0215104 A1 | 7/2023 | Assouline et al. |
| 2023/0215105 A1 | 7/2023 | Assouline et al. |
| 2023/0230292 A1 | 7/2023 | Ivanov et al. |
| 2023/0230328 A1 | 7/2023 | Assouline et al. |
| 2023/0410436 A1 | 12/2023 | Beauchamp et al. |

FOREIGN PATENT DOCUMENTS

| | | |
|---|---|---|
| CN | 103390287 B | 8/2018 |
| CN | 109863532 A | 6/2019 |
| CN | 110168478 A | 8/2019 |
| CN | 106778453 B | 5/2020 |
| CN | 113689324 A | 11/2021 |
| CN | 118451474 A | 8/2024 |
| CN | 118489124 A | 8/2024 |
| CN | 118489125 A | 8/2024 |
| CN | 118489138 A | 8/2024 |
| CN | 118591825 A | 9/2024 |
| EP | 2184092 A2 | 5/2010 |
| EP | 2983138 A1 | 2/2016 |
| EP | 3155560 B1 | 5/2020 |
| EP | 3862849 A1 | 8/2021 |
| JP | 2001230801 A | 8/2001 |
| JP | 5497931 B2 | 3/2014 |
| KR | 101445263 B1 | 9/2014 |
| KR | 20240131413 A | 8/2024 |
| TW | 201503002 A | 1/2015 |
| WO | WO-2003094072 A1 | 11/2003 |

(56) References Cited

FOREIGN PATENT DOCUMENTS

| | | |
|---|---|---|
| WO | WO-2004095308 A1 | 11/2004 |
| WO | WO-2006107182 A1 | 10/2006 |
| WO | WO-2007089020 A1 | 8/2007 |
| WO | WO-2007134402 A1 | 11/2007 |
| WO | WO-2012000107 A1 | 1/2012 |
| WO | WO-2012139276 A1 | 10/2012 |
| WO | WO-2013008251 A2 | 1/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194262 A2 | 12/2014 |
| WO | WO-2014194439 A1 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016090605 A1 | 6/2016 |
| WO | WO-2016/112299 A1 | 7/2016 |
| WO | WO-2016179166 A1 | 11/2016 |
| WO | WO-2016179235 A1 | 11/2016 |
| WO | WO-2017132689 A1 | 8/2017 |
| WO | WO-2017176739 A1 | 10/2017 |
| WO | WO-2017176992 A1 | 10/2017 |
| WO | WO-2018005644 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2020075098 A1 | 4/2020 |
| WO | WO-2021167586 A1 | 8/2021 |
| WO | WO-2023129372 A2 | 7/2023 |
| WO | WO-2023129373 A1 | 7/2023 |
| WO | WO-2023129441 A1 | 7/2023 |
| WO | WO-2023129442 A2 | 7/2023 |
| WO | WO-2023141146 A1 | 7/2023 |
| WO | WO-2023129372 A3 | 8/2023 |
| WO | WO-2023129442 A3 | 8/2023 |
| WO | WO-2023129373 A8 | 7/2024 |

OTHER PUBLICATIONS

"U.S. Appl. No. 17/566,046, Notice of Allowance mailed Nov. 9, 2023", 7 pgs.
"U.S. Appl. No. 17/566,046, Response filed Oct. 16, 2023 to Non Final Office Action mailed Jul. 20, 2023", 10 pgs.
"U.S. Appl. No. 17/566,070, Corrected Notice of Allowability mailed Aug. 3, 2023", 4 pgs.
"U.S. Appl. No. 17/566,070, Non Final Office Action mailed Feb. 16, 2023", 14 pgs.
"U.S. Appl. No. 17/566,070, Non Final Office Action mailed May 3, 2023", 12 pgs.
"U.S. Appl. No. 17/566,070, Notice of Allowance mailed Jul. 12, 2023", 7 pgs.
"U.S. Appl. No. 17/566,070, Notice of Allowance mailed Sep. 20, 2023", 8 pgs.
"U.S. Appl. No. 17/566,070, Response filed Jun. 26, 2023 to Non Final Office Action mailed May 3, 2023", 11 pgs.
"U.S. Appl. No. 17/648,363, Non Final Office Action mailed Aug. 7, 2023", 12 pgs.
"U.S. Appl. No. 17/648,363, Notice of Allowance mailed Oct. 4, 2023", 9 pgs.
"U.S. Appl. No. 17/648,363, Response filed Sep. 19, 2023 to Non Final Office Action mailed Aug. 7, 2023", 11 pgs.
"International Application Serial No. PCT/US2022/052696, International Search Report mailed Aug. 3, 2023", 5 pgs.
"International Application Serial No. PCT/US2022/052696, Invitation to Pay Additional Fees mailed Jun. 13, 2023", 5 pgs.
"International Application Serial No. PCT/US2022/052696, Written Opinion mailed Aug. 3, 2023", 10 pgs.
"International Application Serial No. PCT/US2022/052700, International Search Report mailed May 24, 2023", 5 pgs.
"International Application Serial No. PCT/US2022/052700, Invitation to Pay Additional Fees mailed Mar. 31, 2023", 11 pgs.
"International Application Serial No. PCT/US2022/052700, Written Opinion mailed May 24, 2023", 11 pgs.
"International Application Serial No. PCT/US2022/053618, International Search Report mailed May 10, 2023", 5 pgs.
"International Application Serial No. PCT/US2022/053618, Invitation to Pay Additional Fees mailed Mar. 22, 2023", 9 pgs.
"International Application Serial No. PCT/US2022/053618, Written Opinion mailed May 10, 2023", 8 pgs.
"International Application Serial No. PCT/US2022/053622, International Search Report mailed Jun. 23, 2023", 5 pgs.
"International Application Serial No. PCT/US2022/053622, Invitation to Pay Additional Fees mailed Apr. 28, 2023", 7 pgs.
"International Application Serial No. PCT/US2022/053622, Written Opinion mailed Jun. 23, 2023", 10 pgs.
"International Application Serial No. PCT/US2023/011032, International Search Report mailed May 23, 2023", 7 pgs.
"International Application Serial No. PCT/US2023/011032, Invitation to Pay Additional Fees mailed Mar. 28, 2023", 12 pgs.
"International Application Serial No. PCT/US2023/011032, Written Opinion mailed May 23, 2023", 10 pgs.
Breen, D. E, et al., "Interactive occlusion and automatic object placement for augmented reality", Computer Graphics Forum : Journal of the European Association for Computer Graphics, Wiley-Blackwell, Oxford, vol. 15, No. 3, XP002515919, (Aug. 26, 1996), 11-22.
Liang, Mao, et al., "Deep Convolution Neural Networks for Automatic Eyeglasses Removal", 2nd International Conference on Artificial Intelligence and Engineering Applications, (Sep. 23, 2017), 8 pgs.
Roman, Suvorov, et al., "Resolution-robust Large Mask Inpainting with Fourier Convolutions", Arxiv.Org, Cornell University Library, 201 Olin Library Cornell University Ithaca, NY, (Sep. 15, 2021), 1-16.
Runfeldt, Melissa, "iSee: Using deep learning to remove eyeglasses from faces", [Online] Retrieved from the internet: <https://web.archive.org/web/20170515091918/https://blog.insightdatascience.com/isee-removing-eyeglasses-from-faces-using-deep-learning-d4e7d93537 6f>, (May 15, 2017), 8 pgs.
"U.S. Appl. No. 15/929,374, Non Final Office Action mailed Jul. 12, 2021", 31 pgs.
"U.S. Appl. No. 15/929,374, Notice of Allowance mailed Nov. 19, 2021", 9 pgs.
"U.S. Appl. No. 15/929,374, Response filed Oct. 12, 2021 to Non Final Office Action mailed Jul. 12, 2021", 10 pgs.
"U.S. Appl. No. 15/990,318, Non Final Office Action mailed Oct. 8, 2019", 20 pgs.
"U.S. Appl. No. 15/990,318, Notice of Allowance mailed Jan. 30, 2020", 8 pgs.
"U.S. Appl. No. 15/990,318, Response filed Jan. 6, 2020 to Non Final Office Action mailed Oct. 8, 2019", 11 pgs.
"U.S. Appl. No. 17/301,692, Advisory Action mailed Sep. 11, 2024", 4 pgs.
"U.S. Appl. No. 17/301,692, Examiner Interview Summary mailed Sep. 3, 2024", 3 pgs.
"U.S. Appl. No. 17/301,692, Final Office Action mailed Jul. 18, 2024", 28 pgs.
"U.S. Appl. No. 17/301,692, Non Final Office Action mailed Jan. 19, 2024", 23 pgs.
"U.S. Appl. No. 17/301,692, Response filed Apr. 11, 2024 to Non Final Office Action mailed Jan. 19, 2024", 12 pgs.
"U.S. Appl. No. 17/301,692, Response filed Aug. 29, 2024 to Final Office Action mailed Jul. 18, 2024", 16 pgs.
"U.S. Appl. No. 17/301,692, Response filed Oct. 10, 2024 to Advisory Action mailed Sep. 11, 2024", 14 pgs.
"U.S. Appl. No. 17/565,648, Examiner Interview Summary mailed Nov. 21, 2024", 2 pgs.
"U.S. Appl. No. 17/565,648, Non Final Office Action mailed Aug. 29, 2024", 40 pgs.
"U.S. Appl. No. 17/565,648, Response filed Nov. 20, 2024 to Non Final Office Action mailed Aug. 29, 2024", 14 pgs.

(56) References Cited

OTHER PUBLICATIONS

"U.S. Appl. No. 17/648,363, Corrected Notice of Allowability mailed Jan. 19, 2024", 2 pgs.
"U.S. Appl. No. 17/648,363, Corrected Notice of Allowability mailed Feb. 28, 2024", 2 pgs.
"U.S. Appl. No. 17/651,524, Corrected Notice of Allowability mailed Oct. 25, 2023", 5 pgs.
"U.S. Appl. No. 17/651,524, Non Final Office Action mailed Apr. 13, 2023", 33 pgs.
"U.S. Appl. No. 17/651,524, Notice of Allowance mailed Jul. 11, 2023", 8 pgs.
"U.S. Appl. No. 17/651,524, Response filed Jun. 9, 2023 to Non Final Office Action mailed Apr. 13, 2023", 9 pgs.
"International Application Serial No. PCT/US2022/052696, International Preliminary Report on Patentability mailed Jul. 11, 2024", 12 pgs.
"International Application Serial No. PCT/US2022/052700, International Preliminary Report on Patentability mailed Jul. 11, 2024", 13 pgs.
"International Application Serial No. PCT/US2022/053618, International Preliminary Report on Patentability mailed Jul. 11, 2024", 10 pgs.
"International Application Serial No. PCT/US2022/053622, International Preliminary Report on Patentability mailed Jul. 11, 2024", 12 pgs.
"International Application Serial No. PCT/US2023/011032, International Preliminary Report on Patentability mailed Aug. 2, 2024", 12 pgs.
"International Application Serial No. PCT/US2023/033853, International Search Report mailed Jan. 23, 2024", 5 pgs.
"International Application Serial No. PCT/US2023/033853, Written Opinion mailed Jan. 23, 2024", 8 pgs.
Adel, Ahmadyan, et al., "Instant 3D Object Tracking with Applications in Augmented Reality", Arxiv.Org, Cornell University Library, 201 Olin Library Cornell University Ithaca, NY, (Jun. 23, 2020), 4 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Jung, Sunghoon, et al., "Estimation of a 3D Bounding Box for a Segmented Object Region in a Single Image", IEICE Transactions On Information And Systems, vol. E97.D, No. 11, [Online]. Retrieved from the Internet: <https://search.ieice.org/bin/pdf_link.php?category=D&lang=E&year=2014&fname=e97-d_11_2919&abst=>, (Jan. 1, 2014), 2919-2934.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For". [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.
Walk-Morris, Tatiana, "Amazon debuts AR tool for viewing multiple furniture items in one room", Retail Dive, Dive Brief, (Aug. 27, 2020), 2 pgs.
"U.S. Appl. No. 17/566,032, Non Final Office Action mailed Dec. 12, 2024", 24 pgs.

\* cited by examiner

AR POSITION AND ORIENTATION ALONG A PLANE

PRIORITY CLAIM

This application is a continuation of U.S. patent application Ser. No. 17/566,046, filed on Dec. 30, 2021, which is hereby incorporated by reference in its entirety.

TECHNICAL FIELD

The present disclosure relates generally to providing augmented reality experiences using a messaging application.

BACKGROUND

Augmented Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
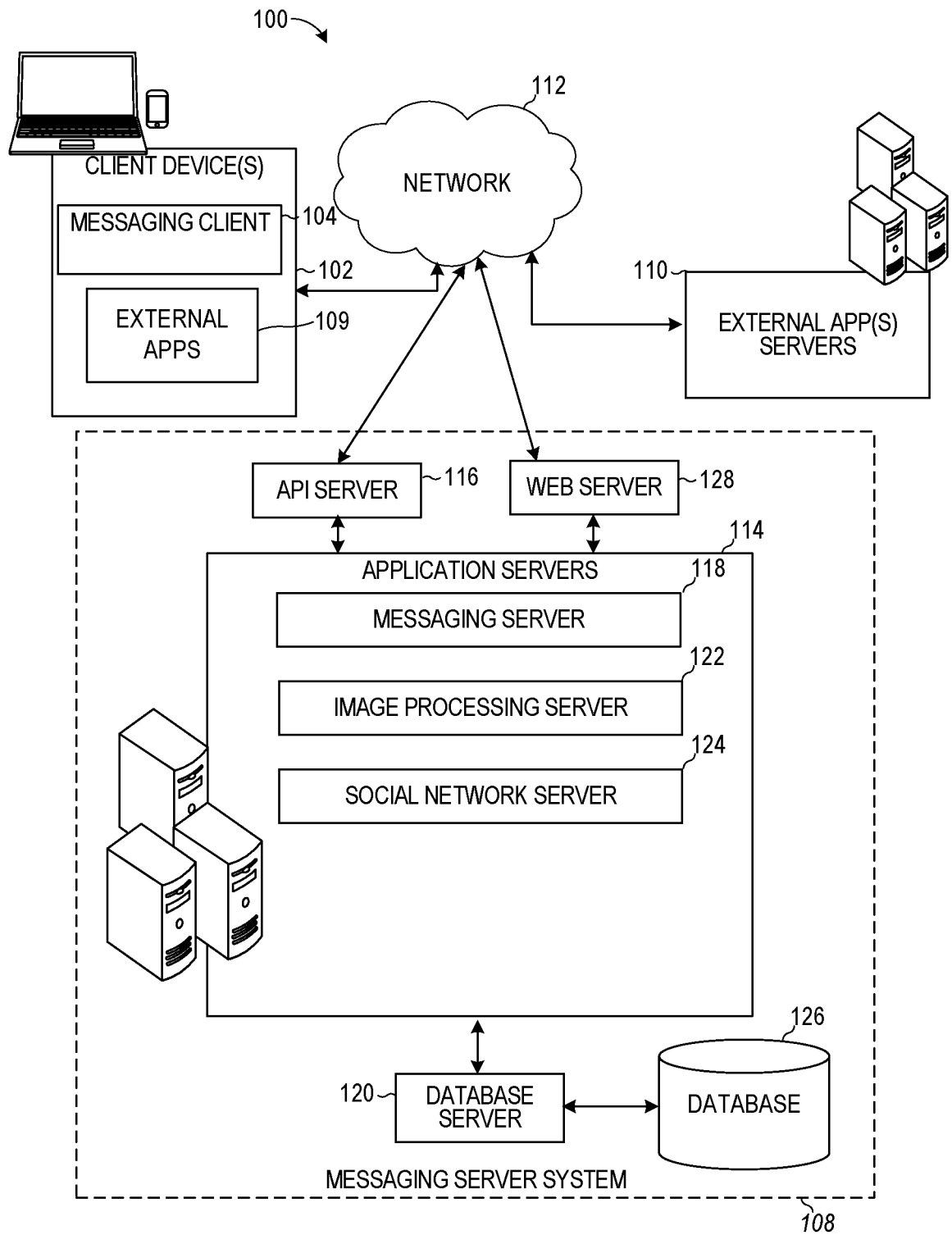
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and ARAR systems allow users to add AR elements to their environment (e.g., captured image data corresponding to a user's surroundings). Such systems can recommend AR elements based on various external factors, such as a current geographical location of the user and various other contextual clues. Some AR systems allow a user to capture a video of a room and select from a list of available AR elements to add to a room to see how the selected AR element looks in the room. These systems allow a user to preview how a physical item looks at a particular location in a user's environment, which simplifies the purchasing process. However, these systems require a user to manually select which AR elements to display within the captured video and where to place the AR elements. Specifically, the user of these systems has to spend a great deal of effort searching through and navigating multiple user interfaces (UIs) and pages of information to identify an item of interest. Then the user has to manually position the selected item within view. In many cases, the user is unaware of the dimensions of the AR elements, which results in the user placing the AR elements in unrealistic locations. These tasks can be daunting and time consuming, which detracts from the overall interest of using these systems and results in wasted resources.

Also, allowing the user to place the AR elements in unrealistic locations can result in the user believing a corresponding real-world product fits in the room and can lead the user to mistakenly purchase the corresponding product. This ends up frustrating the user when the user ends up discovering that the corresponding real-world product does not fit in the room and reduces the level of trust the user has in the AR and VR systems.

The disclosed techniques improve the efficiency of using an electronic device that implements or otherwise accesses an AR/VR system by intelligently automatically determining what room or environment is within view of a camera and automatically indicating to the user where to place an AR item corresponding to a physical (e.g., television, couch, desk, and so forth) or electronically consumable item (e.g., video items, music items, or video game items). Specifically, the disclosed techniques receive a video that includes a depiction of one or more real-world objects in a real-world environment. The disclosed techniques obtain depth information related to the real-world environment and generate a three-dimensional (3D) model of the real-world environment based on the video and the depth information. The disclosed techniques add an AR item to the video based on the 3D model of the real-world environment. The disclosed techniques determine that the AR item has been placed on a vertical plane (surface) of the real-world environment and modify an orientation of the AR item to correspond to an orientation of the vertical plane.

In this way, the disclosed techniques can select and automatically recommend where to place one or more AR elements corresponding to items available for purchase in the current image or video without further input from a user. Also, the disclosed techniques automatically modify an orientation of the AR elements based on an orientation of a surface or plane on which the AR elements are placed. This improves the overall experience of the user in using the electronic device and reduces the overall amount of system resources needed to accomplish a task.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications (also referred to as "external applications" and "external apps") 109 using Application Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via UIs of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, and the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
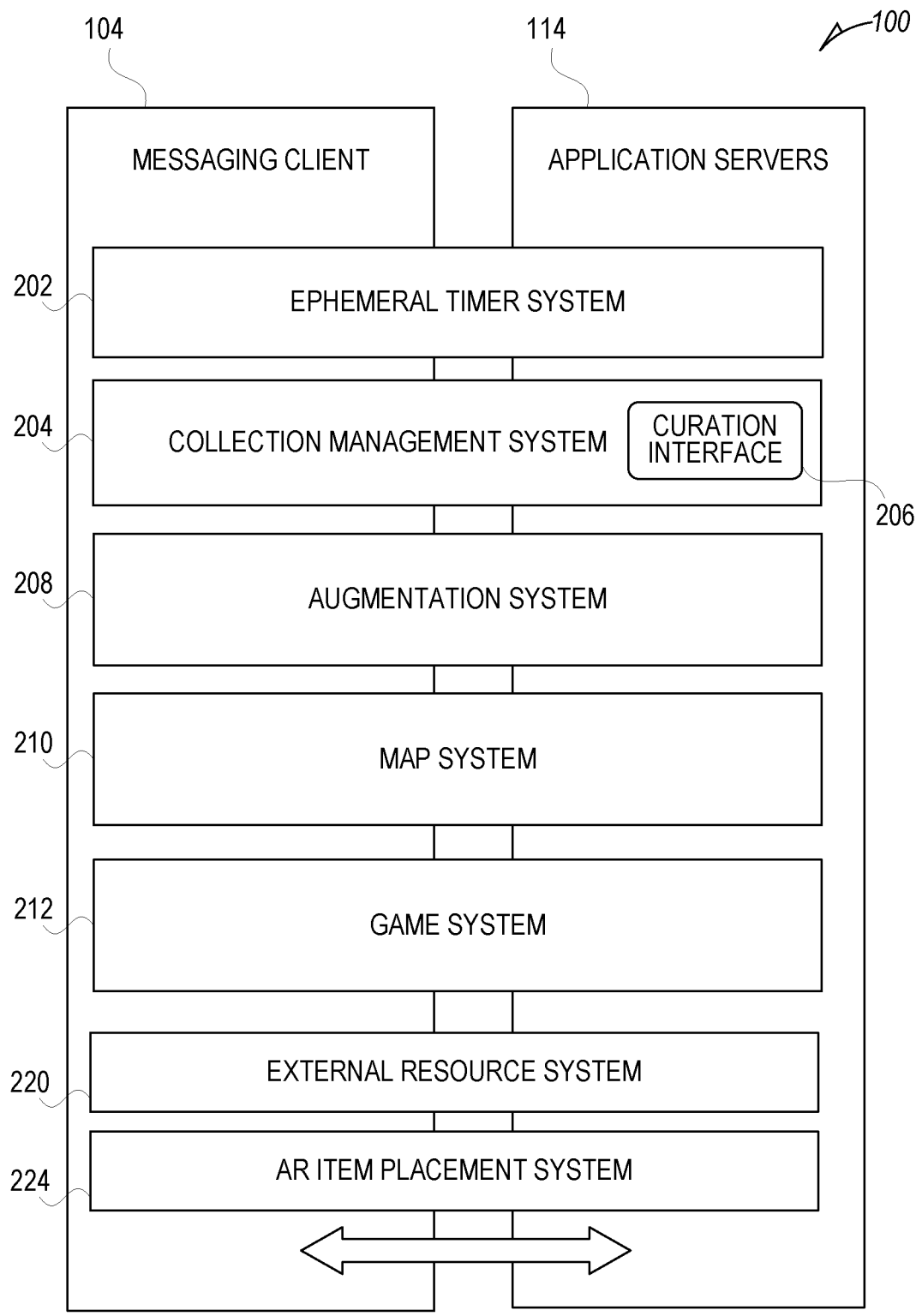
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., launching a home-based AR shopping experience, as discussed in connection with FIGS. 6-10 below).

Figure 3:
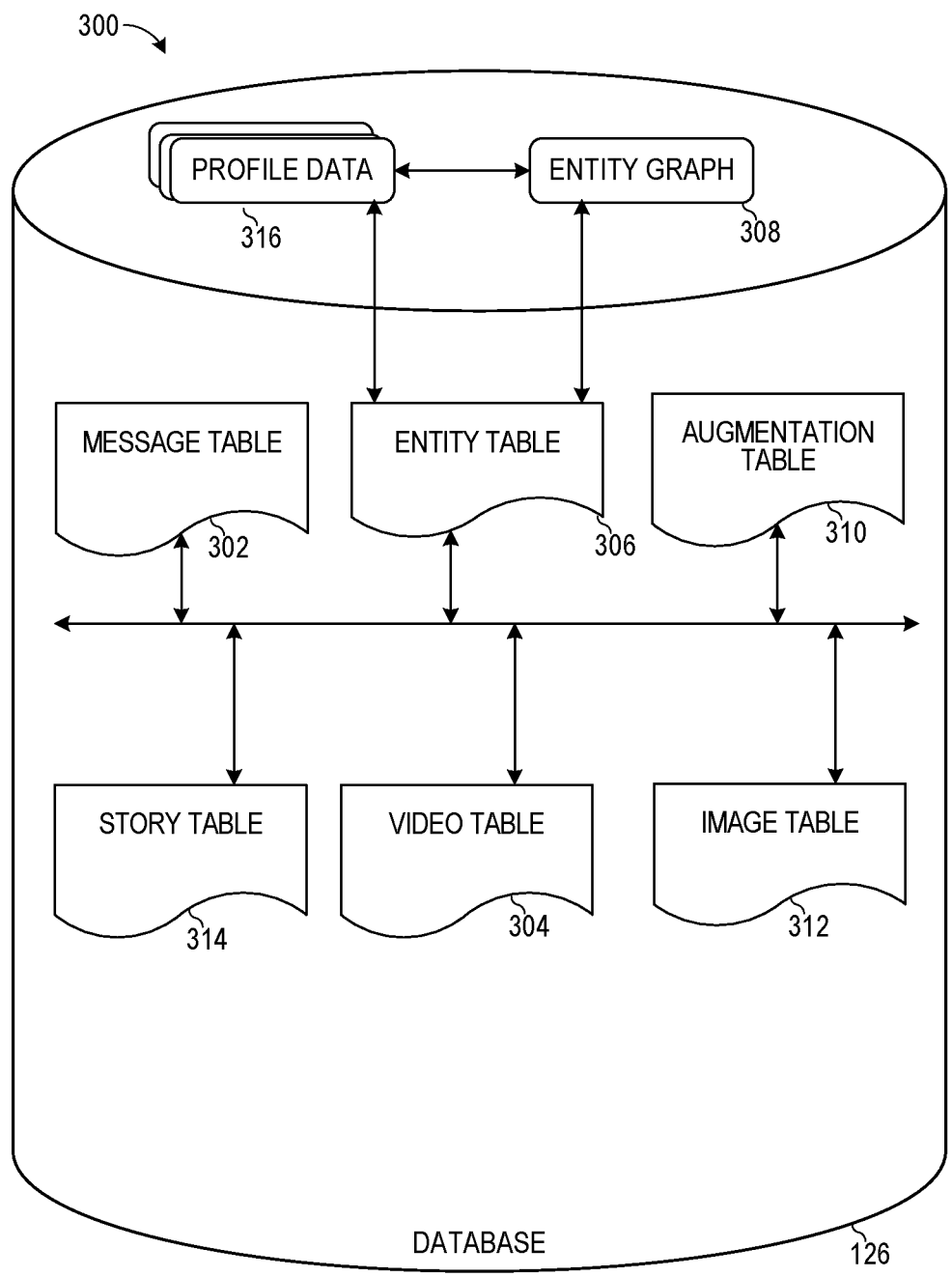
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (e.g., external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a UI of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users in a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the UI of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more UIs (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, and functions (e.g., commands to invoke functions), as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a GUI (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another GUI of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

An AR item placement system 224 receives an image or video from a client device 102 that depicts a real-world environment (e.g., a room in a home). The AR item placement system 224 detects one or more real-world objects depicted in the image or video and uses the detected one or more real-world objects (or features of the real-world environment) to compute a classification for the real-world environment. For example, the AR item placement system 224 can classify the real-world environment as a kitchen, a bedroom, a nursery, a toddler room, a teenager room, an office, a living room, a den, a formal living room, a patio, a deck, a balcony, a bathroom, or any other suitable home-based room classification. Once classified, the AR item placement system 224 identifies one or more items (such as physical products or electronically consumable content items) related to the real-world environment classification. The identified one or more items can be items that are available for purchase.

The AR item placement system 224 retrieves AR representations of the identified items. The AR item placement system 224 presents a list of the AR representations for the user to select. In response to receiving input from the user selecting a first AR representation, the AR item placement system 224 presents a marker in the video feed that depicts the real-world environment. The marker specifies a 3D placement and orientation for the corresponding first AR representation of the item. The marker can have a shape that is generated based on an outline of the corresponding AR representation. For example, the AR item placement system 224 can generate a segmentation of the AR representation and generate a marker that represents a border of the segmentation of the AR representation. The center of the marker can be blank or clear (allowing the underlying video feed over which the marker is displayed to be seen) or filled with a specified color blocking the underlying video feed.

By using the marker and moving a camera around that is being used to capture the video feed, the user can see where the AR representation will ultimately be placed in the real-world environment. In an example, the AR item placement system 224 can obtain placement and orientation parameters for the AR representation. The AR item placement system 224 can determine a current placement and orientation of the marker within the video feed. The AR item placement system 224 can determine whether the current placement and orientation of the marker matches the placement and orientation parameters of the AR representation. The placement and orientation parameters can include fit data specifying minimum or maximum dimensions of free space needed to fit the AR representation in 3D space of the real-world environment. The placement and orientation parameters can specify whether the AR representation can be placed in a placement and orientation that overlaps an interfering real-world object (e.g., whether the AR representation can be displayed on top of a real-world object included in the real-world environment). For example, the AR representation can correspond to a television that can be placed on a television stand or hung on a wall. In such cases, the placement and orientation parameters can specify that the placement and orientation of the AR representation cannot overlap an interfering real-world object (e.g., a real-world television) if the interfering real-world object is on the wall (a first portion of the real-world environment). The placement and orientation parameters can specify that the placement and orientation of the AR representation can overlap an interfering real-world object (e.g., a real-world table or television stand) if the interfering real-world object is on the floor (a second portion of the real-world environment).

In response to determining that the current placement and orientation of the marker fails to match the placement and orientation parameters of the AR representation, the AR item placement system 224 maintains display of the marker in the video feed (e.g., as an overlay in the real-world environment). In response to determining that the current placement and orientation of the marker matches the placement and orientation parameters of the AR representation, the AR item placement system 224 replaces a display of the marker in the video feed with a display of the AR representation.

In some examples, the AR item placement system 224 determines that the marker has been placed on a vertical plane, such as a wall or other vertical surface. In response, the AR item placement system 224 obtains an orientation of the vertical plane currently being received in the video feed. The AR item placement system 224 modifies the orientation of the marker to correspond to the orientation of the vertical plane. In response to determining that the marker includes dimensions that fit in the area of the video feed over which the marker is positioned (e.g., the marker does not overlap or intersect any real-world object), the AR item placement system 224 presents the AR representation and removes display of the marker. As the AR representation is moved around in response to input from the user, the AR item placement system 224 continues to adjust the orientation of the AR representation to continue to match the orientation of the vertical plane over which the AR representation is placed. In response to determining that the AR representation has been moved to a new placement that fails to match the placement and orientation parameters of the AR representation, the AR item placement system 224 displays the marker around a border of the AR representation to indicate to the user that the current placement fails to satisfy the placement parameters (e.g., because the current placement overlaps or intersects another real-world object). An illustrative implementation of the AR item placement system 224 is shown and described in connection with FIG. 5 below.

The AR item placement system 224 is a component that can be accessed by an AR/VR application implemented on the client device 102. The AR/VR application uses a red, green, blue (RGB) camera to capture an image of a room in a home. The AR/VR application applies various trained machine learning techniques on the captured image or video of the real-world environment to classify the real-world environment. The AR/VR application includes a depth sensor to generate depth data. The depth data can be used to generate a 3D model of the real-world environment that is captured in order to incorporate or place the AR representations and markers of the AR representations into the image or video. For example, the AR/VR application can add an AR piece of furniture, such as an AR chair or sofa, to the image or video that is captured by the client device 102 based on the depth data and the 3D model of the real-world environment. In some implementations, the AR/VR application continuously captures images of the real-world environment in real time or periodically to continuously or periodically update the AR representations of items available for purchase. This allows the user to move around in the real world and see updated AR representations of items available for purchase corresponding to a current real-world environment depicted in an image or video in real time.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a UI by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, and to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a GUI displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The GUI, presenting the modification performed by the transformation system, may supply the user with additional interaction options. Such options may be based on the interface used to initiate the content capture and selection of a particular computer animation model (e.g., initiation from a content creator UI). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping or selecting the individual face or a series of individual faces displayed within the GUI.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the UI of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can also store training data for training one or more machine learning techniques (models) to classify a room in a home or household. The training data can include a plurality of images and videos and their corresponding ground-truth room classifications. The images and videos can include a mix of all sorts of real-world objects that can appear in different rooms in a home or household. The one or more machine learning techniques can be trained to extract features of a received input image or video and establish a relationship between the extracted features and a room classification. Once trained, the machine learning technique can receive a new image or video and can compute a room classification for the newly received image or video.

The data structures 300 can also store a list or plurality of different expected objects for different room classifications. For example, the data structures 300 can store a first list of expected objects for a first room classification. Namely, a room classified as a kitchen can be associated with a list of expected objects, such as appliances and/or furniture items including: tea maker, toaster, kettle, mixer, refrigerator, blender, cabinet, cupboard, cooker hood, range hood, microwave, dish soap, kitchen counter, dinner table, kitchen scale, pedal bin, grill, and drawer. As another example, a room classified as a living room can be associated with a list of expected objects including: wing chair, television (TV) stand, sofa, cushion, telephone, TV, speaker, end table, tea set, fireplace, remote, fan, floor lamp, carpet, table, blinds, curtains, picture, vase, and grandfather clock.

As another example, a room classified as a bedroom can be associated with a list of expected objects, such as furniture items including: headboard, footboard and mattress frame, mattress and box springs, mattress pad, sheets and pillowcases, blankets, quilts, comforter, bedspread, duvet, bedskirt, sleeping pillows, specialty pillows, decorative pillows, pillow covers and shams, throws (blankets), draperies, rods, brackets, valances, window shades, blinds, shutters, nightstands, occasional tables; lamps: floor, table, hanging; wall sconces, alarm clock, radio, plants and plant containers, vases, flowers, candles, candleholders, artwork, posters, prints, photos, frames, photo albums, decorative objects and knick-knacks, dressers and clothing, armoire, closet, TV cabinet, chairs, loveseat, chaise lounge, ottoman, bookshelves, decorative ledges, books, magazines, bookends, trunk, bench, writing desk, vanity table, mirrors, rugs, jewelry boxes and jewelry, storage boxes, baskets, trays, telephone; TV, cable box, satellite box, DVD player and videos, tablets, nightlight.

Data Communications Architecture

Figure 4:
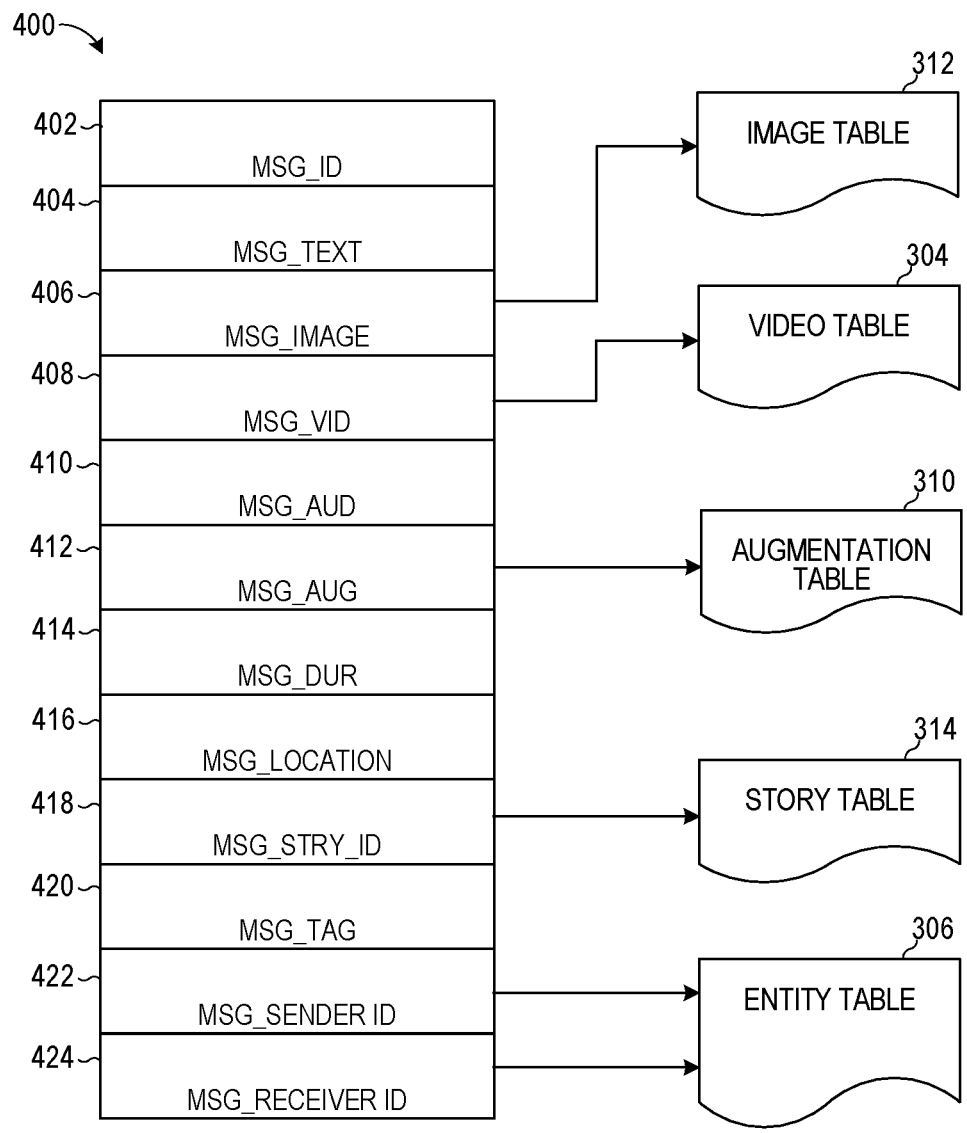
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a UI of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

AR Item Placement System

Figure 5:
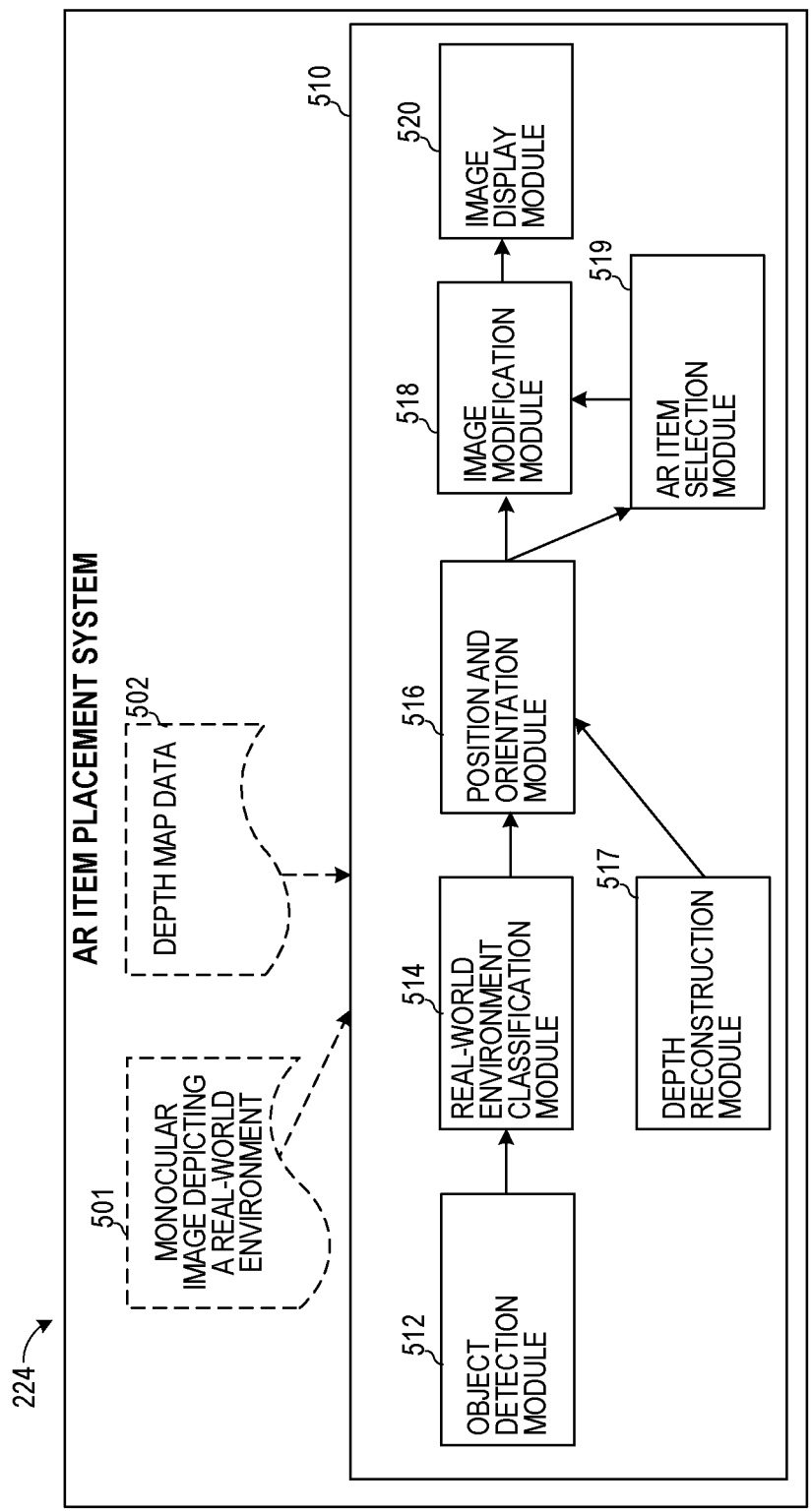
FIG. 5 is a block diagram showing an example AR item placement system, according to some examples.

FIG. 5 is a block diagram showing an example AR item placement system 224, according to examples. The AR item placement system 224 includes a set of components 510 that operate on a set of input data (e.g., a monocular image (or video)) depicting a real-world environment 501 and depth map data 502 (obtained from a depth sensor or camera of a client device 102). The AR item placement system 224 includes an object detection module 512, a real-world environment classification module 514, a depth reconstruction module 517 (which can be used to generate a 3D model of the real-world environment), a position and orientation module 516, an image modification module 518, an AR item selection module 519, and an image display module 520. All or some of the components of the AR item placement system 224 can be implemented by a server, in which case, the monocular image depicting a real-world environment 501 and the depth map data 502 are provided to the server by the client device 102. In some cases, some or all of the components of the AR item placement system 224 can be implemented by the client device 102 or can be distributed across a set of client devices 102.

The object detection module 512 receives a monocular image (or video) depicting a real-world environment 501. This image or video can be received as part of a real-time video stream, a previously captured video stream, or a new image captured by a camera of the client device 102. The object detection module 512 applies one or more machine learning techniques to identify real-world physical objects that appear in the monocular image depicting a real-world environment 501. For example, the object detection module 512 can segment out individual objects in the image and assign a label or name to the individual objects. Specifically, the object detection module 512 can recognize a sofa as an individual object, a TV as another individual object, a light fixture as another individual object, and so forth. Any type of object that can appear or be present in a particular real-world environment (e.g., a room in a home or household) can be recognized and labeled by the object detection module 512.

The object detection module 512 provides the identified and recognized objects to the real-world environment classification module 514. The real-world environment classification module 514 can compute or determine a real-world environment classification of the real-world environment depicted in the monocular image depicting the real-world environment 501 based on the identified and recognized objects received from the object detection module 512. In some implementations, the real-world environment classification module 514 compares the objects received from the object detection module 512 to a plurality of lists of expected objects, with each associated with a different real-world environment classification that is stored in data structures 300. For example, the real-world environment classification module 514 can compare the objects detected by the object detection module 512 to a first list of expected objects associated with a living room classification. The real-world environment classification module 514 can compute a quantity or percentage of the objects that are detected by the object detection module 512 and that are included in the first list. The real-world environment classification module 514 can assign a relevancy score to the first list. The real-world environment classification module 514 can then similarly compare the objects detected by the object detection module 512 to a second list of expected objects associated with another real-world environment classification (e.g., a kitchen). The real-world environment classification module 514 can then compute a quantity or percentage of the objects that are detected by the object detection module 512 and that are included in the second list and can assign a relevancy score to the second list. The real-world environment classification module 514 can identify which of the lists that are stored in the data structures 300 is associated with a highest relevancy score. The real-world environment classification module 514 can then determine or compute the real-world environment classification of the real-world environment depicted in the monocular image depicting the real-world environment 501 based on the real-world environment classification associated with the identified list of expected objects with the highest relevancy score.

In another implementation, the real-world environment classification module 514 can implement one or more machine learning techniques to classify a real-world environment. The machine learning techniques can implement a classifier neural network that is trained to establish a relationship between one or more features of an image of a real-world environment with a corresponding real-world environment classification.

During training, the machine learning technique of the real-world environment classification module 514 receives a given training image (e.g., a monocular image or video depicting a real-world environment, such as an image of a living room or bedroom) from training image data stored in data structures 300. The real-world environment classification module 514 applies one or more machine learning techniques on the given training image. The real-world environment classification module 514 extracts one or more features from the given training image to estimate a real-world environment classification for the real-world environment depicted in the image or video. For example, the real-world environment classification module 514 obtains the given training image depicting a real-world environment and extracts features from the image that correspond to the real-world objects that appear in the real-world environment. In some cases, rather than receiving an image depicting a real-world environment, the real-world environment classification module 514 receives a list or plurality of objects detected by another module or machine learning technique. The real-world environment classification module 514 is trained to determine a real-world environment classification based on the features of the objects received from the other machine learning technique.

The real-world environment classification module 514 determines the relative positions of the detected real-world objects and/or features of the monocular image depicting the real-world environment 501. The real-world environment classification module 514 then estimates or computes a real-world environment classification based on the relative positions of the detected real-world objects and/or features of the monocular image depicting the real-world environment 501. The real-world environment classification module 514 obtains a known or predetermined ground-truth real-world environment classification of the real-world environment depicted in the training image from the training data. The real-world environment classification module 514 compares (computes a deviation between) the estimated real-world environment classification with the ground truth real-world environment classification. Based on a difference threshold of the comparison (or deviation), the real-world environment classification module 514 updates one or more coefficients or parameters and obtains one or more additional training images of a real-world environment. In some cases, the real-world environment classification module 514 is first trained on a set of images associated with one real-world environment classification and is then trained on another set of images associated with another real-world environment classification.

After a specified number of epochs or batches of training images have been processed and/or when a difference threshold (or deviation) (computed as a function of a difference or deviation between the estimated classification and the ground-truth classification) reaches a specified value, the real-world environment classification module 514 completes training, and the parameters and coefficients of the real-world environment classification module 514 are stored as a trained machine learning technique or trained classifier.

In an example, after training, the real-world environment classification module 514 receives a monocular input image depicting a real-world environment 501 as a single RGB image from a client device 102 or as a video of multiple images. The real-world environment classification module 514 applies the trained machine learning technique(s) to the received input image to extract one or more features and to generate a prediction or estimation or real-world environment classification of the monocular image depicting a real-world environment 501.

The real-world environment classification module 514 provides the real-world environment classification to the position and orientation module 516. The position and orientation module 516 obtains a list or plurality of AR representations of real-world objects stored in the data structures 300 that is associated with the real-world environment classification. For example, the position and orientation module 516 obtains a list including: headboard, footboard and mattress frame, mattress and box springs, mattress pad, sheets and pillowcases, blankets, quilts, comforter, bedspread, duvet, bedskirt, sleeping pillows, specialty pillows, decorative pillows, pillow covers and shams, throws (blankets), draperies, rods, brackets, valances, window shades, blinds, shutters, nightstands, occasional tables; lamps: floor, table, hanging; wall sconces, alarm clock, radio, plants and plant containers, vases, flowers, candles, candleholders, artwork, posters, prints, photos, frames, photo albums, decorative objects and knick-knacks, dressers and clothing, armoire, closet, TV cabinet, chairs, loveseat, chaise lounge, ottoman, bookshelves, decorative ledges, books, magazines, bookends, trunk, bench, writing desk, vanity table, mirrors, rugs, jewelry boxes and jewelry, storage boxes, baskets, trays, telephone; television, cable box, satellite box, DVD player and videos, tablets, and nightlight.

The position and orientation module 516 communicates the list of AR representations to the AR item selection module 519. In one example, the AR item selection module 519 can present the list to a user in a GUI. The list can be presented as an overlay on top of the real-world environment depicted in the image or video captured by the camera of the client device 102. The list can include pictorial representations of each AR representation on the list and/or textual labels that identify each AR representation on the list. The AR item selection module 519 can receive input from a user that selects a given AR representation from the list. In response, the AR item selection module 519 communicates the selected AR representation to the position and orientation module 516. In another example, the AR item selection module 519 can access a user profile. The AR item selection module 519 can automatically select an AR representation from the list based on the user profile. Namely, the AR item selection module 519 can select an AR representation that best matches interests or preferences of the user stored in the user profile. In some examples, the AR item selection module 519 can select a given AR representation that corresponds to a context or discussion that is determined from a conversation that includes a list of messages exchanged between the user and one or more friends.

The position and orientation module 516 receives the selection of the AR representation and obtains one or more position and orientation parameters associated with the AR representation. The one or more position and orientation parameters are used to place the AR representation within the real-world environment depicted in the image or video. In some cases, the position and orientation parameters include a prioritized list of possible positions and orientations for the AR representation. For example, the position and orientation parameters can specify a wall real-world object as a top ranked position and orientation for the AR representation. The position and orientation parameters can specify a floor real-world object as a lower ranked position and orientation for the AR representation. The position and orientation module 516 can control which position and orientation is recommended for the AR representation based on determining whether each position and orientation is available or unavailable starting with the top ranked position and orientation. The position and orientation parameters can also store or specify fit data (including dimensions of the AR representation) that can be used to compute a minimum available of free space (e.g., area free of (area that fails to include) real-world objects, such as TVs, refrigerators, couches, and so forth, that are not physical parts of the real-world environment itself, such as walls, ceilings, and floors) needed to place the AR representation. The position and orientation module 516 communicates with the depth reconstruction module 517 to obtain a 3D model of the real-world environment.

The depth reconstruction module 517 receives depth map data 502 from a depth sensor, a LiDAR sensor, or depth camera of the client device 102. The depth reconstruction module 517 can generate a 3D model (mesh) representation or reconstruction of the real-world environment depicted in the image or video captured by the client device 102. The depth reconstruction module 517 can provide the 3D model representation or reconstruction of the room to the position and orientation module 516. The depth reconstruction module 517 can also compute an orientation of one or more vertical and horizontal planes or surfaces depicted in the image or video captured by the client device 102. In one example, the orientation of a given plane can be computed by determining an angle formed between a normal of the camera of the client device and two or more points on the given plane. In another example, the orientation can be computed by computing a distance between a first point on the given plane intersected by a first ray projected from the client device 102 towards the given plane and a second point intersected by a second ray projected from the client device 102 towards the given plane. The orientation can be used to adjust an orientation of the AR representation that is added to the image or video.

Based on the 3D mesh representation or reconstruction, the position and orientation module 516 can further refine which of the list of 3D positions and orientations stored in the position and orientation parameters of the AR representation are available. For example, the position and orientation module 516 can determine, based on the 3D model of the real-world environment, that there exists a television or other real-world object on a wall in the real-world environment. In such cases, the position and orientation module 516 can determine that the wall position and orientation stored as having the highest priority in the list of position and orientations for the AR representation is not available. In response, the position and orientation module 516 can select another position and orientation for the AR representation that is next in the prioritized list after the wall, such as the floor. The position and orientation module 516 can compute dimensions representing free space on the floor based on the 3D model of the real-world environment. The position and orientation module 516 can compare the dimensions representing free space on the floor to the dimensions associated with the AR representation. In response to determining that the dimensions match or that the available dimensions exceed the dimensions associated with the AR representation, the position and orientation module 516 can determine that the AR representation can be placed on the floor of the real-world environment.

The position and orientation module 516 can generate a marker that represents the AR representation. In an example, the position and orientation module 516 can obtain a 3D model of the real-world object corresponding to the AR representation. The position and orientation module 516 can generate a segmentation of the 3D model to identify borders of the 3D model of the real-world object. The position and orientation module 516 can generate a marker that includes an outline of the borders of the 3D model. In some cases, the marker can include a partially transparent graphical depiction of the real-world object. The position and orientation module 516 can adjust an orientation of the marker to correspond to the orientation determined for the surface or plane on which the marker is placed in the image or video.

The position and orientation module 516 communicates the position and orientation parameters of the AR representation, the 3D model of the real-world environment, the position and orientation that has been determined to be available, and the marker to the image modification module 518. The image modification module 518 adds the marker as an overlay on top of the image or video depicting the real-world environment. If placed on a vertical plane in the image or video, the marker, is oriented in the same manner as the orientation of the depiction of the vertical plane. This orientation is locked so that as the marker is moved around the image or video based on input from a user, the marker continues to be oriented in the same orientation as the surface while the marker is moved around the vertical surface. Namely, the angle of the marker along a surface normal of the camera of the client device 102 can remain locked in position while the marker is moved around the vertical plane or surface in other directions. This maintains the illusion that the marker is placed on the vertical plane or surface while being dragged around to new positions along the surface. This results in an appearance of the marker as being hung or placed on the vertical plane (e.g., the wall). If the marker is placed on a floor or horizontal surface, the orientation of the marker is adjusted to match or correspond to the orientation of the horizontal surface.

The image modification module 518 instructs the image display module 520 to display the image or video depicting the real-world environment with the marker to the user. The marker can be initially displayed at a first 3D position and orientation. The first 3D position and orientation can be a default 3D position and orientation, such as at a center of a display depicting the real-world environment. In other implementations, the image modification module 518 automatically displays the marker in the real-world environment at a 3D position and orientation that satisfy or correspond to the position and orientation parameters of the AR representation. For example, the image modification module 518 can determine that there is free space on a wall in the real-world environment that can fit the AR representation. In such cases, the image modification module 518 can automatically position the marker on the wall and request input from the user to replace the marker with the AR representation after the user confirms the automatic placement and orientation.

The image modification module 518 can determine that the first 3D position and orientation fails to match the position and orientation parameters of the AR representation. For example, the image modification module 518 can determine that the marker overlaps a real-world object, such as a desk or television hanging on a wall (this is the interfering real-world object). In such cases, the image modification module 518 continues to display the marker as the overlay on the video feed depicting the real-world environment. The image modification module 518 can detect movement of the marker to a second 3D position and orientation. For example, the image modification module 518 can detect that the camera of the client device 102 has been raised, lowered, turned left, or turned right. In such cases, a new portion of the real-world environment can be depicted and the marker can continue to be placed at the center of the display. Because a new portion of the real-world environment is depicted while the marker continues to be displayed at the center of the display, the image modification module 518 can determine that the marker is positioned at the second 3D position and orientation in the real-world environment.

The image modification module 518 can determine that the second 3D position and orientation now matches or corresponds to the position and orientation parameters of the AR representation. For example, the image modification module 518 can determine that the marker overlaps a portion of a wall that does not include an interfering real-world object or that the marker overlaps a portion of free space on a floor that has sufficient dimensions to fit the AR representation. In such cases, the image modification module 518 can automatically replace the marker that is overlaid on the real-world environment with the AR representation. This allows the user to see how the AR representation looks in the real-world environment at the second position and orientation. The AR representation remains persistently displayed and locked at the second position and orientation to allow the user to move about the real-world environment including walking behind the AR representation. The image modification module 518 can receive input from the user moving or repositioning the AR representation to a new 3D position and orientation. The image modification module 518 can determine that the new 3D position and orientation fails to match the position and orientation parameters of the AR representation. For example, the image modification module 518 can determine that the AR representation overlaps a real-world object, such as a desk or television hanging on a wall (this is the interfering real-world object). In such cases, the image modification module 518 replaces the display of the AR representation with a display of the marker.

In some examples, the image modification module 518 receives input from a user that moves (repositions) the AR representation to a new 3D position and orientation. The image modification module 518 can determine that at least a portion of the AR representation overlaps an interfering real-world object. The image modification module 518 can determine that the interfering real-world object is included in a list of allowed interfering real-world objects associated with the AR representation (e.g., a closet, table, and so forth). In such, cases, instead of replacing the AR representation with a marker, the image modification module 518 can hide the portion of the AR representation that is determined to overlap the interfering real-world object behind the interfering real-world object. This can result in a display that shows one portion of the AR representation and another portion hidden behind the interfering real-world object.

In some examples, the AR representation can be displayed on a first vertical plane (e.g., a first wall) depicted in the image or video. The AR representation can be presented in response to determining that a current placement and orientation satisfies fit parameters and fails to overlap or intersect a real-world object. Namely, the image modification module 518 can determine that the dimensions associated with the AR representation fit within the real-world placement and orientation on which the AR representation is displayed. The orientation of the AR representation can correspond to the orientation of the vertical plane to give the illusion that the AR representation is part of the real-world environment (e.g., that the AR representation is hung on a wall in the real-world environment). The image modification module 518 can receive input that drags or moves the AR representation to a new placement position along the first vertical plane. As the AR representation is dragged or moved, the orientation of the AR representation continues to correspond to the orientation of the plane or surface on which the AR representation is placed.

In some cases, a first portion of the AR representation can be moved to a position that corresponds to a second vertical plane that is adjacent to the first vertical plane. For example, the AR representation can be moved along a wall towards a column or a protrusion extending away from the wall. In response, the image modification module 518 can modify the orientation of the first portion of the AR representation to correspond to the orientation of the second vertical plane while maintaining an orientation of other portions of the AR representation as corresponding to the orientation of the first vertical surface. Namely, the first portion of the AR representation can be displayed along a surface of a column or protrusion extending from a wall and other portions of the AR representation can continue to be displayed along the wall. The image modification module 518 can determine that the placement and orientation parameters of the AR representation indicate that the AR representation is non-malleable and corresponds to a rigid object. In such cases, the image modification module 518 can determine that having the different portions of the AR representation be oriented in different directions fails to satisfy the placement and orientation parameters of the AR representation. In response, the image modification module 518 presents the marker (e.g., a red border) around the AR representation (or changes a display attribute of the AR representation) to indicate to the user that the current placement is unrealistic and fails to satisfy the placement and orientation parameters of the AR representation. In an example, changing a display attribute can include making the AR representation partially transparent, opaque, disappear, or any other suitable change.

In another example, the image modification module 518 can determine that the AR representation has been moved to a new position along the first vertical plane that overlaps or intersects one or more real-world interfering objects. In response, the image modification module 518 presents the marker (e.g., a red border) around the AR representation to indicate to the user that the current placement is unrealistic and fails to satisfy the placement and orientation parameters of the AR representation.

In some examples, the entire AR representation can be moved to a position that corresponds to a second vertical plane that is adjacent to the first vertical plane. For example, the AR representation can be moved along a wall towards a column or a protrusion extending away from the wall or can be moved to another wall that is in the real-world environment. In response, the image modification module 518 can modify the orientation of the AR representation to correspond to the orientation of the second vertical plane. The image modification module 518 can obtain fit information for the AR representation to determine whether any portion of the AR representation intersects a real-world object (e.g., an adjacent wall, ceiling, or floor). In response to determining that the AR representation fails to fit in the current placement position because of an intersection with a real-world object, the image modification module 518 presents the marker (e.g., a red border) around the AR representation to indicate to the user that the current placement is unrealistic and fails to satisfy the placement and orientation parameters of the AR representation. Otherwise, the image modification module 518 continues to display the AR representation in the orientation corresponding to the second vertical plane.

In some examples, the image modification module 518 receives input that moves or drags the AR representation from the vertical plane to a horizontal plane. In response, the image modification module 518 adjusts the orientation of the AR representation to correspond to the orientation of the horizontal plane. In an implementation, the image modification module 518 locks or prevents changes to an axis of the AR representation corresponding to the orientation along the horizontal plane that can be different from the axis previously locked when the AR representation was placed on the vertical surface.

Figure 6:
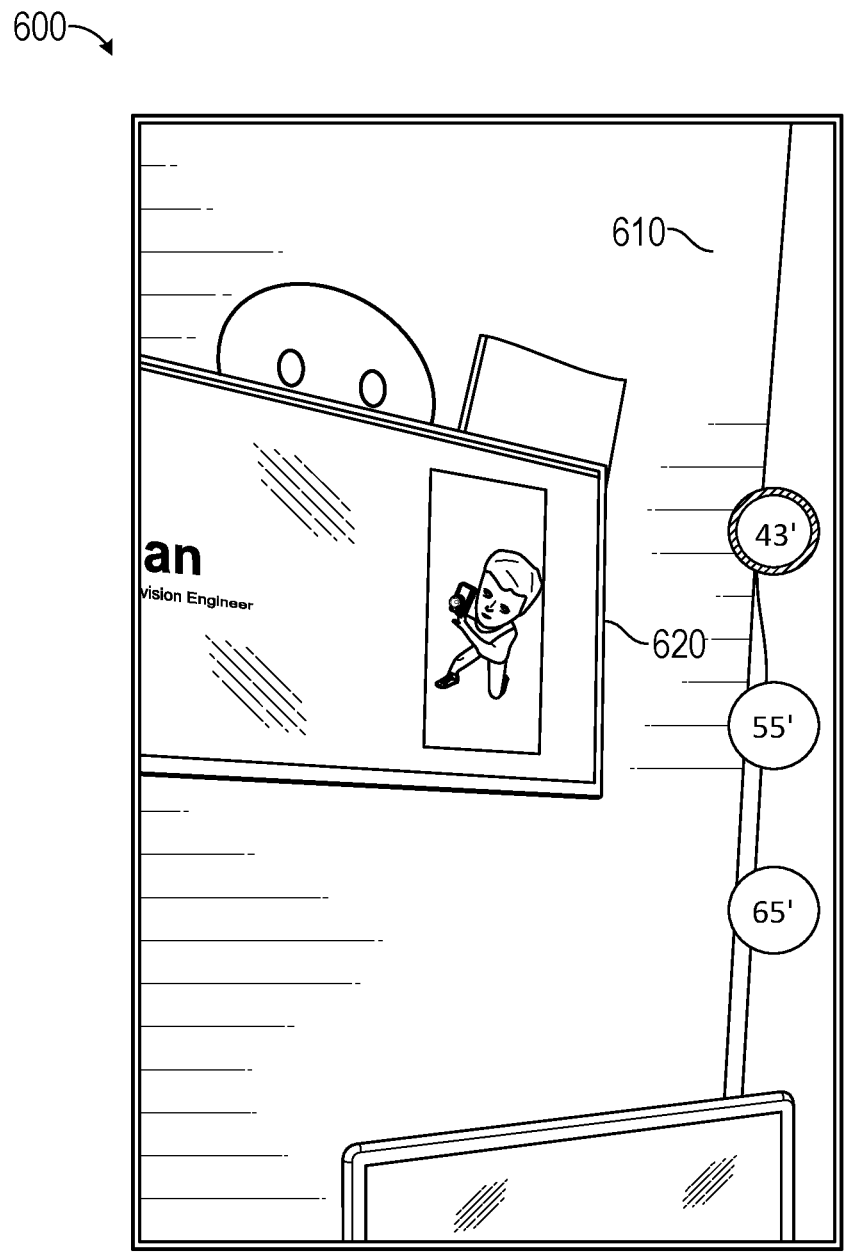
FIGS. 6-9 are diagrammatic representations of outputs of the AR item placement system, in accordance with some examples.
Figure 7:
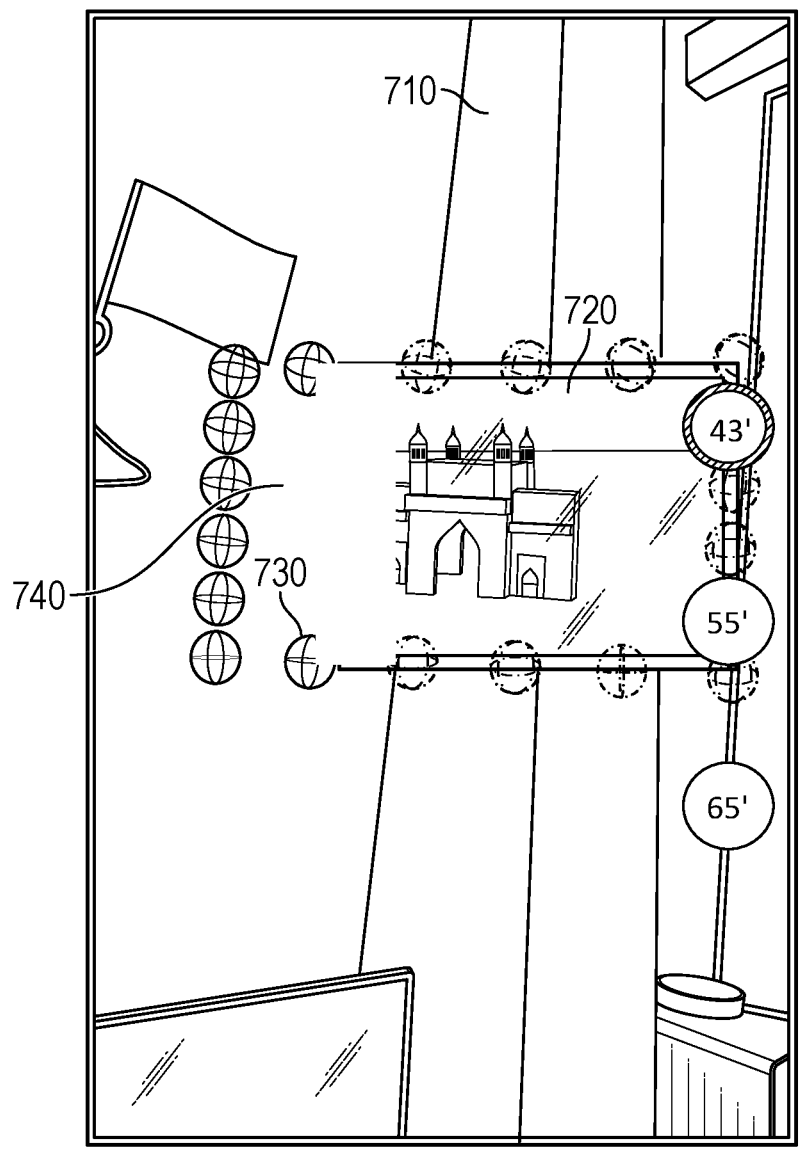

FIGS. 6-9 are diagrammatic representations of outputs of the AR recommendation system, in accordance with some examples. Specifically, as shown in FIG. 6, the AR item placement system 224 receives an image or video 600 that depicts a real-world environment. The AR item placement system 224 receives a user selection of an AR representation 620 (e.g., an AR television) or automatically selects the AR representation 620 based on a real-world environment classification. In an example, the AR item placement system 224 determines that the AR representation 620 has been placed at a particular placement position in the image or video 600. The AR item placement system 224 determines that the particular placement position corresponds to a vertical surface or plane 610 (e.g., a wall). The AR item placement system 224 determines an orientation of the vertical surface or plane 610 and modifies the orientation of the AR representation 620 to correspond to the orientation of the vertical surface or plane 610. The AR item placement system 224 displays the AR representation 620 within the image or video 600 that depicts the real-world environment.

The AR item placement system 224 can receive input from a user that drags or moves the AR representation 620 to a new placement in the image or video 600. The AR item placement system 224 drags the AR representation 620 along the vertical surface or plane 610 towards another vertical surface or plane. Specifically, as shown in the image or video depicted in the UI 700 of FIG. 7, the AR item placement system 224 has moved the AR representation 720 towards another surface or plane 710. The other surface or plane 710 can correspond to a column or other wall that is adjacent to the surface or plane 610. The AR item placement system 224 can determine that a first portion 740 of the AR representation 720 remains placed on the surface or plane 610 while another portion is placed on the other surface or plane 710. The AR representation 720 can determine that such placement along two surfaces or planes having different orientations violates placement and orientation parameters of the AR representation 720. In response, the AR item placement system 224 presents a marker 730 or otherwise changes a display attribute of the AR representation 720. The marker 730 can be displayed along a border of the AR representation 720.

In some cases, the AR representation 720 can hide a first portion of the AR representation 720 that is oriented along the surface or plane 610 and can maintain visible a second portion of the AR representation that is oriented along the surface or plane 710. This informs the user that the current placement violates the placement and orientation parameters of the AR representation 720. When the AR item placement system 224 receives input that moves the AR representation 720 to a new position that does not violate the placement and orientation parameters of the AR representation 720, the AR item placement system 224 removes display of the marker 730.

Figure 8:
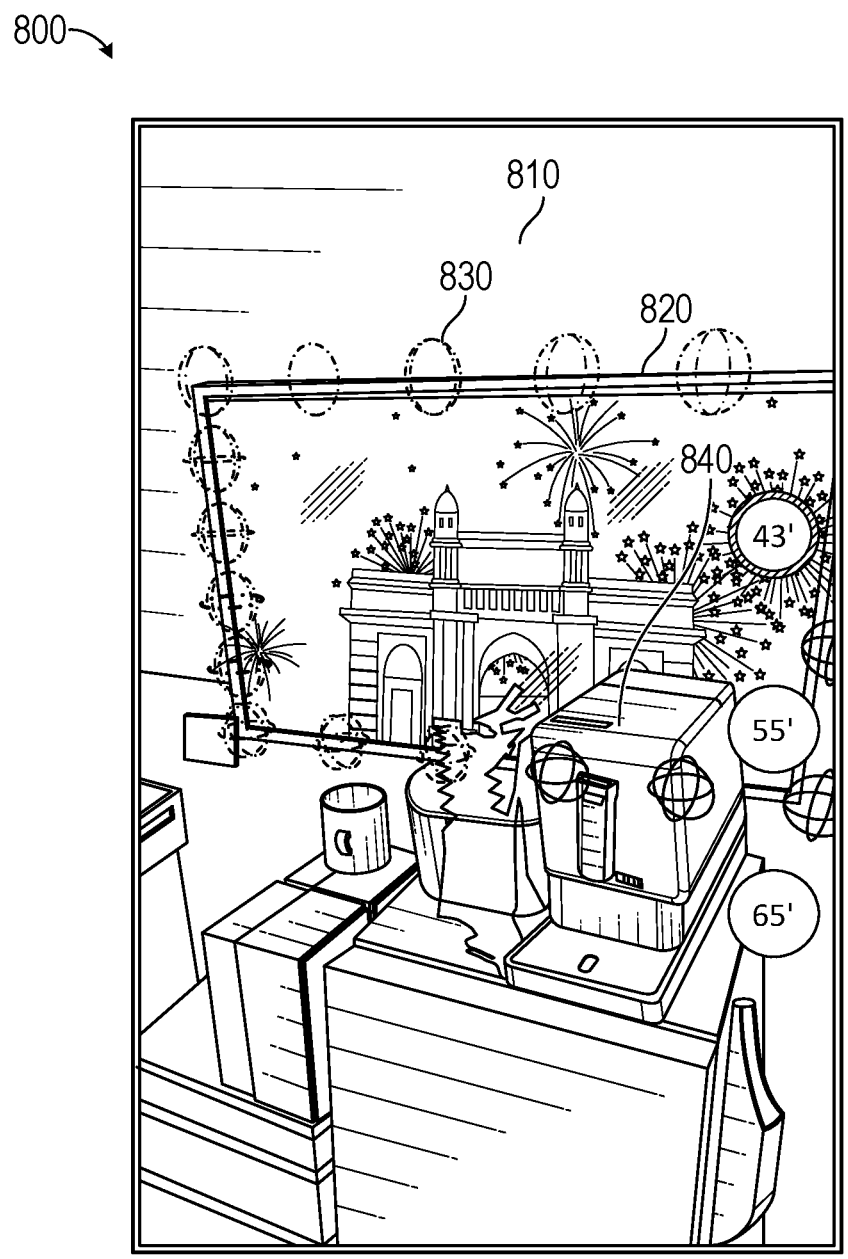

In some examples, as shown in FIG. 8, a UI 800 is provided that depicts a video or image in which the AR item placement system 224 receives input that drags or moves the AR representation 820 to a new placement position along the surface or plane 810. The AR item placement system 224 can determine that the new placement position overlaps or intersects one or more real-world objects 840. The AR item placement system 224 can determine that such placement that overlaps or intersects an interfering real-world object violates placement and orientation parameters of the AR representation 720. In response, the AR item placement system 224 presents a marker 830 or otherwise changes a display attribute of the AR representation 820. When the AR item placement system 224 receives input that moves the AR representation 820 to a new position that does not violate the placement and orientation parameters of the AR representation 820, the AR item placement system 224 removes display of the marker 830.

Figure 9:
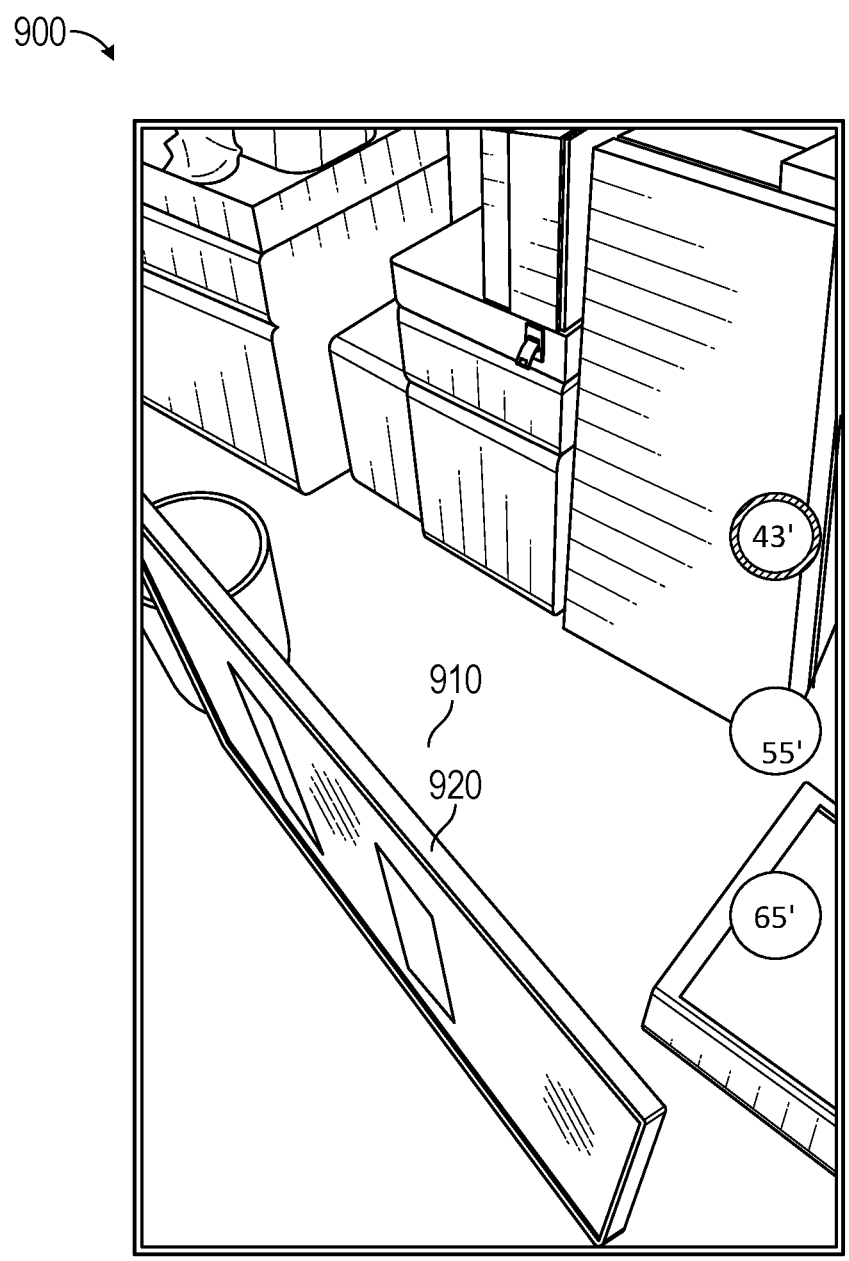

As shown in the image or video depicted in the UI 900 of FIG. 9, The AR item placement system 224 can determine that the AR representation 920 has been moved and repositioned on a horizontal plane or surface 910 (e.g., a floor). In response, the AR item placement system 224 adjusts the orientation of the AR representation to correspond to the orientation of the horizontal plane. In an implementation, the AR item placement system 224 locks or prevents changes to an axis of the AR representation 920 corresponding to the orientation along the horizontal plane that can be different from the axis previously locked when the AR representation was placed on the vertical surface. The AR item placement system 224 allows the user to walk around the AR representation 920 while maintaining the AR representation 920 in the fixed position on the horizontal plane or surface 910. This allows the user to see in 3D how the AR representation 920 looks in the real-world environment.

Figure 10:
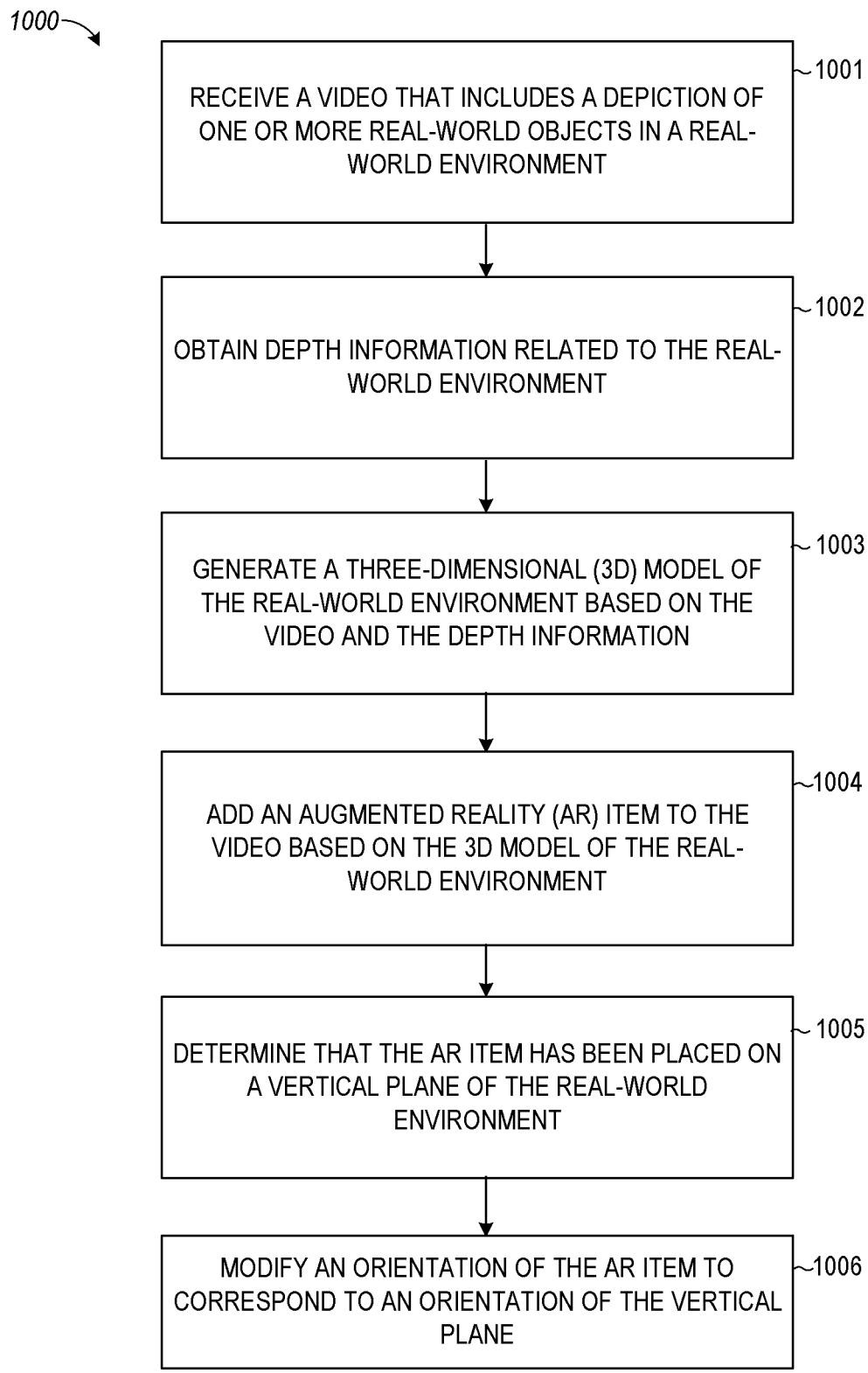
FIG. 10 is a flowchart illustrating example operations of the AR item placement system, according to some examples.

FIG. 10 is a flowchart of a process 1000, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, a client device 102 receives a video that includes a depiction of one or more real-world objects in a real-world environment, as discussed above.

At operation 1002, the client device 102 obtains depth data related to the real-world environment, as discussed above.

At operation 1003, the client device 102 generates a 3D model of the real-world environment based on the video and the depth data, as discussed above.

At operation 1004, the client device 102 adds an AR item to the video based on the 3D model of the real-world environment, as discussed above.

At operation 1005, the client device 102 determines that the AR item has been placed on a vertical plane of the real-world environment, as discussed above.

At operation 1006, the client device 102 modifies an orientation of the AR item to correspond to an orientation of the vertical plane, as discussed above.

Machine Architecture

Figure 11:
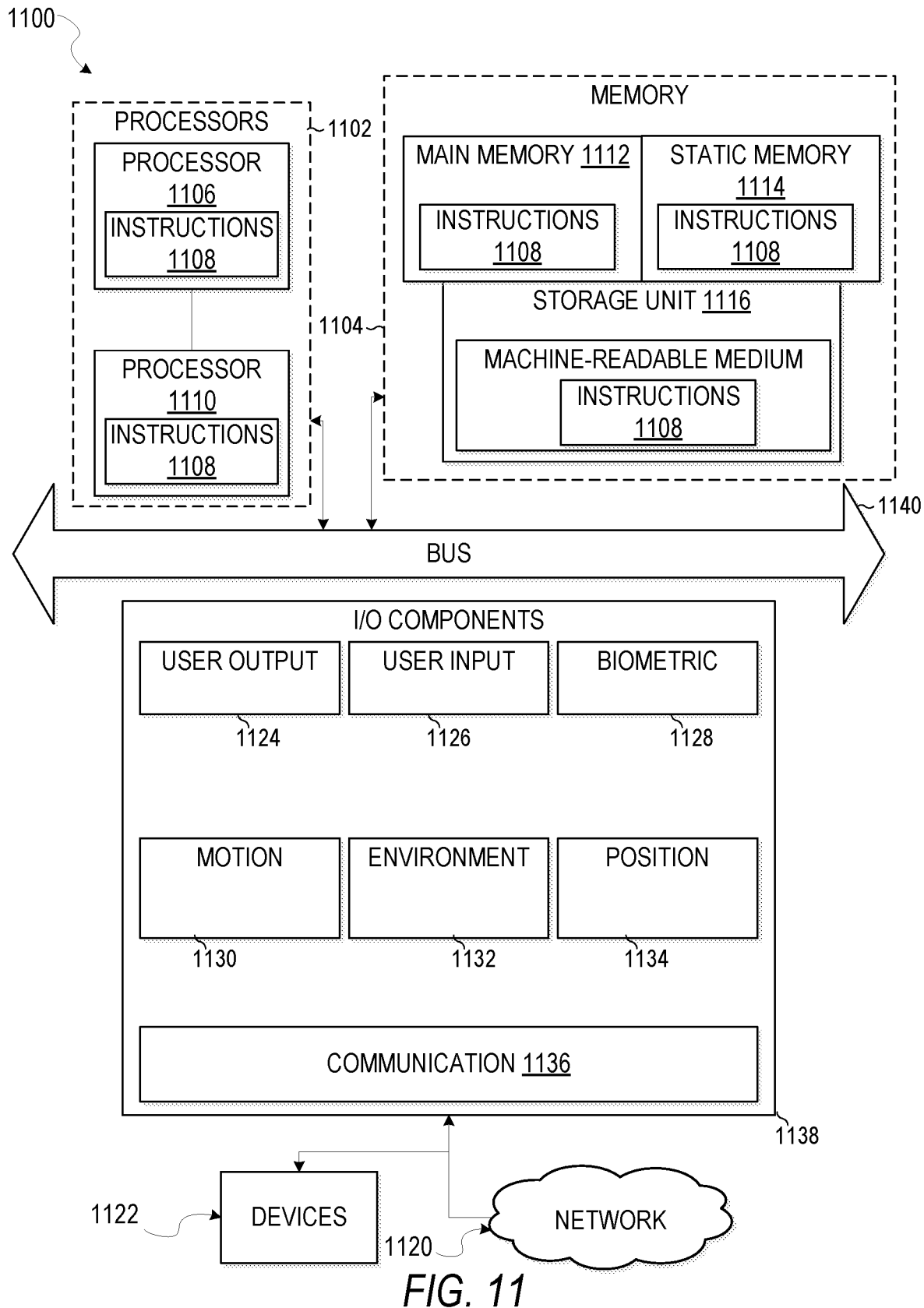
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within a machine-readable medium within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., HTTP). Similarly, the instructions 1108 may be transmitted or received using a transmission medium via a coupling (e.g., a peer-to-peer coupling) to the devices 1122.

Software Architecture

Figure 12:
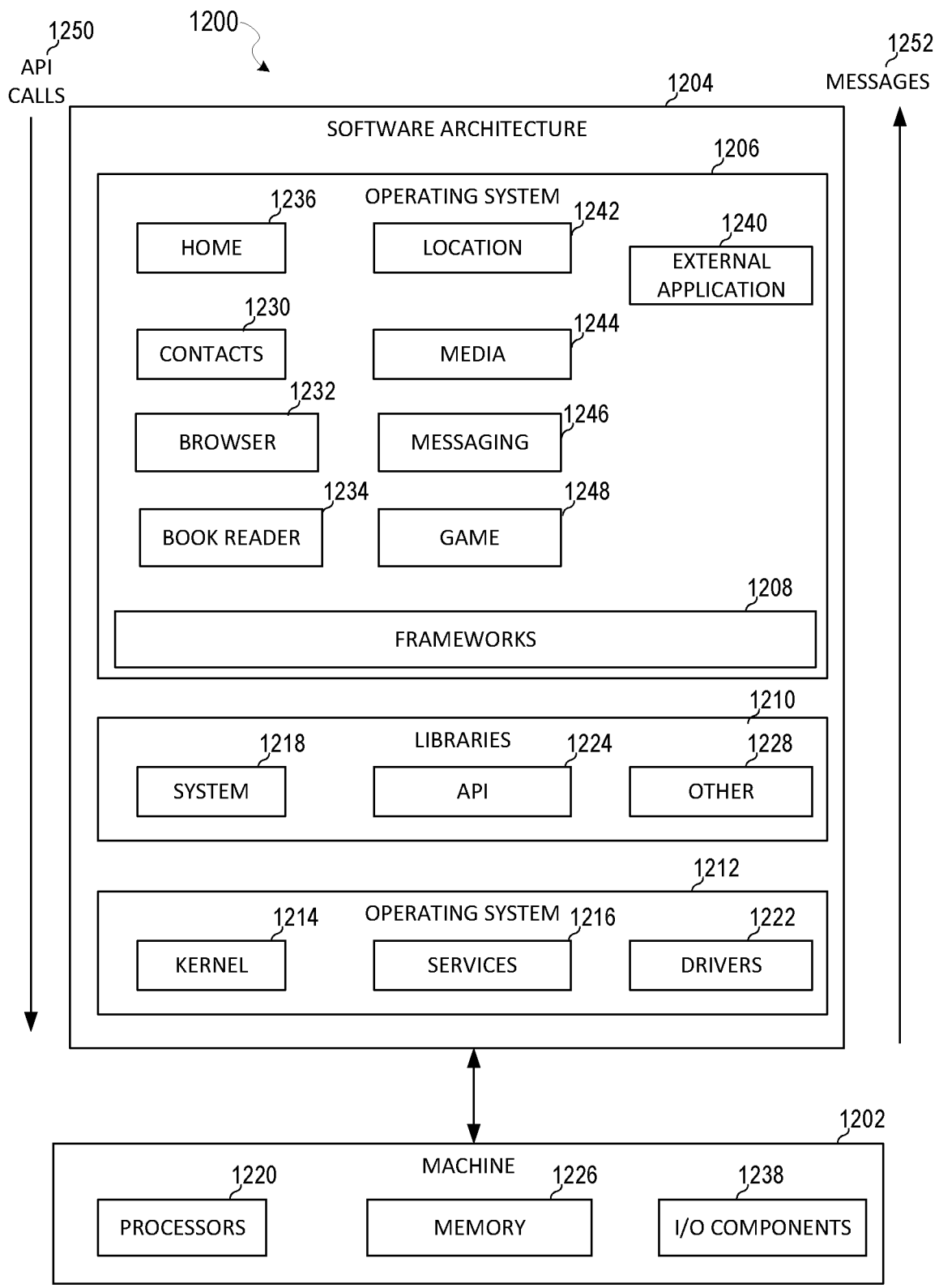
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various GUI functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as an external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    receiving, by one or more processors, a video that includes a depiction of one or more real-world objects in a real-world environment;
    generating a three-dimensional (3D) model of the real-world environment;
    adding an augmented reality (AR) item to the video based on the 3D model of the real-world environment; and changing a display attribute of the AR item in response to determining that the AR item has been placed in proximity to an interfering real-world object.

2. The method of claim 1, further comprising:
determining that the AR item has been placed on a vertical plane of the real-world environment comprising a first placement and orientation position; and
modifying an orientation of the AR item to correspond to an orientation of the vertical plane.

3. The method of claim 2, further comprising:
detecting a change in the orientation of the vertical plane, the change resulting from movement of a camera used to capture the video; and
continuously modifying the orientation of the AR item based on the detected change.

4. The method of claim 1, further comprising:
receiving input that moves the AR item to a different 3D placement in the real-world environment; and
moving the AR item to the different 3D placement while maintaining an orientation of the AR item.

5. The method of claim 1, further comprising:
receiving input that moves the AR item to a different 3D placement in the real-world environment;
detecting that the different 3D placement corresponds to a horizontal plane of the real-world environment; and
modifying an orientation of the AR item to correspond to an orientation of the horizontal plane.

6. The method of claim 5, wherein the horizontal plane corresponds to a floor of the real-world environment.

7. The method of claim 1, further comprising:
receiving LiDAR sensor data to obtain depth data;
processing the 3D model to identify the one or more real-world objects depicted in the video; and
selecting a first placement and orientation position of a plurality of placement and orientation positions for the AR item based on the one or more real-world objects in the real-world environment.

8. The method of claim 7, further comprising:
determining priority values for the plurality of placement and orientation positions.

9. The method of claim 1, further comprising adding to a display of the AR item a marker in response to determining that the AR item has been placed in proximity to the interfering real-world object.

10. The method of claim 9, wherein the marker is displayed along a border of the AR item.

11. The method of claim 1, further comprising:
obtaining dimensions of the AR item; and
determining, based on the dimensions of the AR item, that the AR item overlaps or intersects the interfering real-world object.

12. The method of claim 1, further comprising:
receiving interaction data relating to the AR item, the interaction data comprising movement of the AR item within 3D space of the video;
repositioning the AR item within the video based on the interaction data; and
in response to the repositioning, hiding one or more portions of the AR item behind a real-world object depicted in the video in response to detecting overlap between a position of the AR item and a position of the real-world object.

13. The method of claim 1, further comprising training a neural network classifier to determine a real-world environment classification, wherein the real-world environment classification is used to select an orientation for the AR item.

14. The method of claim 13, further comprising:
receiving training data comprising a plurality of training images and ground truth real-world environment classifications for each of the plurality of training images, each of the plurality of training images depicting a different type of real-world environment.

15. The method of claim 14, further comprising:
applying the neural network classifier to a first training image of the plurality of training images to estimate a real-world environment classification of the real-world environment depicted in the first training image; and
computing a deviation between the estimated real-world environment classification and the ground truth real-world environment classification associated with the first training image.

16. The method of claim 15, further comprising:
updating parameters of the neural network classifier based on the computed deviation.

17. A system comprising:
at least one processor configured to perform operations comprising:
receiving a video that includes a depiction of one or more real-world objects in a real-world environment;
generating a three-dimensional (3D) model of the real-world environment;
adding an augmented reality (AR) item to the video based on the 3D model of the real-world environment; and
changing a display attribute of the AR item in response to determining that the AR item has been placed in proximity to an interfering real-world object.

18. The system of claim 17, wherein the operations further comprise:
receiving input that moves the AR item to a different 3D placement in the real-world environment; and
moving the AR item to the different 3D placement while maintaining an orientation of the AR item.

19. A non-transitory machine-readable storage medium that includes instructions that, when executed by one or more processors of a machine, cause the machine to perform operations comprising:
receiving a video that includes a depiction of one or more real-world objects in a real-world environment;
generating a three-dimensional (3D) model of the real-world environment;
adding an augmented reality (AR) item to the video based on the 3D model of the real-world environment; and
object changing a display attribute of the AR item in response to determining that the AR item has been placed in proximity to an interfering real-world object.

20. The non-transitory machine-readable storage medium of claim 19, wherein the operations further comprise:
receiving input that moves the AR item to a different 3D placement in the real-world environment; and
moving the AR item to the different 3D placement while maintaining an orientation of the AR item.

* * * * *

UNITED STATES PATENT AND TRADEMARK OFFICE
CERTIFICATE OF CORRECTION

PATENT NO. : 12,299,832 B2  
APPLICATION NO. : 18/435793  
DATED : May 13, 2025  
INVENTOR(S) : Assouline et al.

Page 1 of 1

It is certified that error appears in the above-identified patent and that said Letters Patent is hereby corrected as shown below:

In the Claims

In Column 38, Line 52, in Claim 19, before "changing", delete "object"

Signed and Sealed this  
Thirteenth Day of January, 2026

John A. Squires  
*Director of the United States Patent and Trademark Office*